(12) United States Patent
Otsuka et al.

(10) Patent No.: US 11,397,398 B2
(45) Date of Patent: Jul. 26, 2022

(54) AUTHENTICITY DETERMINATION SYSTEM, IMAGE FORMING APPARATUS, AND PRINTING METHOD

(71) Applicant: Ricoh Company, Ltd., Tokyo (JP)

(72) Inventors: Taira Otsuka, Kanagawa (JP); Masaki Yoshino, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 207 days.

(21) Appl. No.: 16/551,906

(22) Filed: Aug. 27, 2019

(65) Prior Publication Data

US 2020/0079097 A1    Mar. 12, 2020

(30) Foreign Application Priority Data

Sep. 10, 2018 (JP) .............................. JP2018-169156

(51) Int. Cl.
*G03G 15/00* (2006.01)
*B41J 2/175* (2006.01)
(Continued)

(52) U.S. Cl.
CPC ...... *G03G 15/5091* (2013.01); *B41J 2/17546* (2013.01); *B41J 2/17559* (2013.01);
(Continued)

(58) Field of Classification Search
CPC ........... G03G 15/5091; G03G 21/1875; G03G 21/1892; B41J 2/17546; B41J 2/17559
See application file for complete search history.

(56) References Cited

U.S. PATENT DOCUMENTS

| 7,296,873 B2 * | 11/2007 | Harada | G03G 15/556 347/14 |
| 9,369,287 B1 * | 6/2016 | Sarvestani | G06F 21/645 |

(Continued)

FOREIGN PATENT DOCUMENTS

| JP | 2002-326443 A | 11/2002 |
| JP | 2004-246464 A | 9/2004 |

(Continued)

OTHER PUBLICATIONS

Extended European Search Report dated Feb. 5, 2020 in European Patent Appliation No. 19190311.1, 8 pages.
(Continued)

*Primary Examiner* — Erika J. Villaluna
(74) *Attorney, Agent, or Firm* — Xsensus LLP

(57) ABSTRACT

In an authenticity determination system, an image forming apparatus acquires apparatus identification information for identifying the image forming apparatus from a memory of the image forming apparatus, and consumables container identification information for identifying a container of predetermined consumables from the container of the consumables mounted in the image forming apparatus. A server stores the apparatus identification information and the consumables container identification information in association with each other, receives the apparatus identification information and the consumables container identification information transmitted from the image forming apparatus, and determines whether the received apparatus identification information and the received consumables container identification information are stored in association with each other. When the information on the determination is affirmative, the image forming apparatus executes printing based on output source identification information including the apparatus identification information and the consumables
(Continued)

container identification information on an output using the predetermined consumables.

18 Claims, 17 Drawing Sheets

(51) Int. Cl.
    *G03G 15/08*      (2006.01)
    *G03G 21/18*      (2006.01)
    *H04N 1/44*      (2006.01)
    *G06F 21/44*      (2013.01)
    *G06F 3/12*      (2006.01)

(52) U.S. Cl.
    CPC ....... *G03G 15/0855* (2013.01); *G03G 15/553* (2013.01); *G03G 21/1892* (2013.01); *G06F 3/1222* (2013.01); *G06F 3/1238* (2013.01); *G06F 21/44* (2013.01); *H04N 1/4413* (2013.01); *H04N 1/4426* (2013.01); *G06F 2221/2129* (2013.01)

(56) References Cited

U.S. PATENT DOCUMENTS

| | | | |
|---|---|---|---|
| 9,871,943 B1 | 1/2018 | Hashizume | |
| 2017/0309104 A1* | 10/2017 | Lewis | ................. G07D 7/0043 |
| 2019/0101864 A1* | 4/2019 | Nagasaki | ........... G03G 15/0865 |
| 2019/0204760 A1 | 7/2019 | Suzuki et al. | |

FOREIGN PATENT DOCUMENTS

| | | | |
|---|---|---|---|
| JP | 2005-178179 A | | 7/2005 |
| JP | 2006-146620 A | | 6/2006 |
| JP | 2007-055783 | | 3/2007 |
| JP | 2008-077238 | | 4/2008 |
| JP | 2013083794 A | * | 5/2013 |
| JP | 2018-017940 | | 2/2018 |
| JP | 2018-060169 | | 4/2018 |
| JP | 2018-084991 | | 5/2018 |

OTHER PUBLICATIONS

Office Action dated May 24, 2022 in Japanese Patent Application No. 2018-169156, 6 pages.

* cited by examiner

AUTHENTICITY DETERMINATION SYSTEM, IMAGE FORMING APPARATUS, AND PRINTING METHOD

CROSS-REFERENCE TO RELATED APPLICATIONS

This patent application is based on and claims priority pursuant to 35 U.S.C. § 119(a) to Japanese Patent Application No. 2018-169156, filed on Sep. 10, 2018 in the Japan Patent Office, the entire disclosure of which is hereby incorporated by reference herein.

BACKGROUND

Technical Field

The present disclosure relates to an authenticity determination system, an image forming apparatus, and a printing method.

Discussion of the Background Art

Image forming apparatuses performance can be maximized by using genuine consumables, such as toner and paper, sold by the manufacturer of the image forming apparatus.

Conventionally, techniques have been devised to promote the use of genuine products, such as an image forming apparatus that rejects consumables when the identification information of the mounted consumables is not stored in advance.

SUMMARY

Embodiments of the present disclosure describe an authenticity determination system, an image forming apparatus, and a printing method. The image forming apparatus acquires apparatus identification information for identifying the image forming apparatus from a memory of the image forming apparatus, and consumables container identification information for identifying a container of predetermined consumables from the container of the consumables mounted in the image forming apparatus. The server stores the apparatus identification information and the consumables container identification information in association with each other, receives the apparatus identification information and the consumables container identification information transmitted from the image forming apparatus, and determines whether the received apparatus identification information and the received consumables container identification information are stored in association with each other. When the information on the determination is affirmative, the image forming apparatus executes printing based on output source identification information including the apparatus identification information and the consumables container identification information on an output using the predetermined consumables.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

Figure 1A:
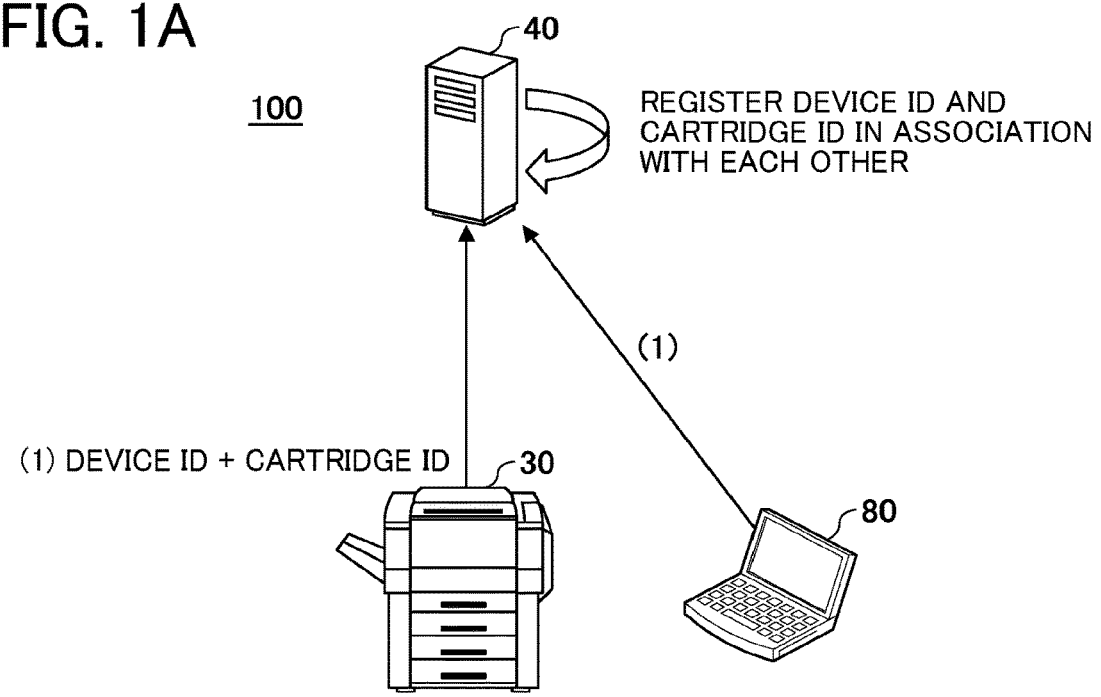
FIG. 1A and FIG. 1B are diagrams illustrating an outline of operation of an authenticity determination system of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

An authenticity determination system (as an example of a claimed system) and a printing method performed by the authenticity determination system are described hereinafter with reference to the appended drawings as embodiments of the present disclosure.

<Schematic Operation of the Authenticity Determination System>

Figure 1B:
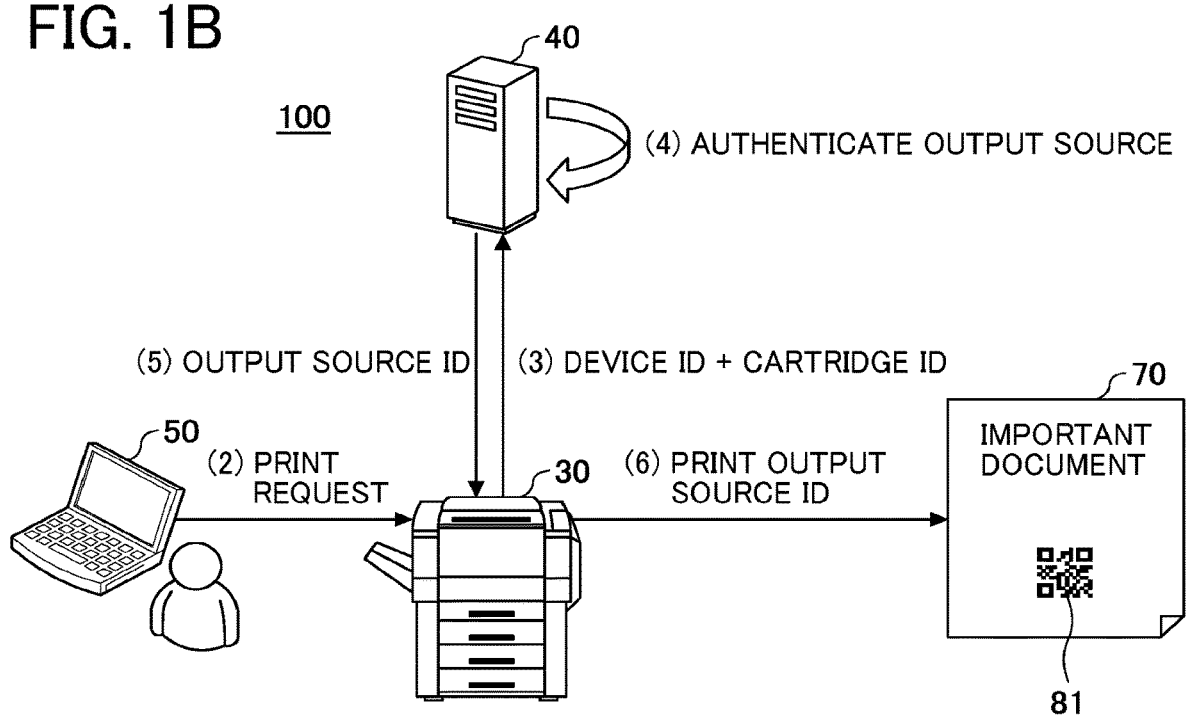

Operation of the authenticity determination system 100 when printing an output is described with reference to FIG. 1A and FIG. 1B. FIG. 1A and FIG. 1B are diagrams illustrating an outline of operation of the authenticity determination system 100. In the present embodiment, authenticity determination is implemented by associating identification information of an image forming apparatus 30 (a device ID) and the identification information of a toner cartridge (a cartridge ID).

(1) FIG. 1A is a diagram illustrating association between the device ID and the cartridge ID. There are mainly two methods for registering the device ID and the cartridge ID of toner associated with each other in a management server 40. One is a method in which a registration terminal 80 performs registration in response to an operation of a customer engineer or the like, and the other is a method in which the image forming apparatus 30 registers the cartridge in response to detecting attachment of the cartridge. The management server 40 is, for example, a server that manages a state of the image forming apparatus 30. Since the toner in the cartridge is consumables, the association between the device ID and the cartridge ID is registered again when the cartridge is replaced.

(2) FIG. 1B is a diagram illustrating printing of an output source ID. The user operates a terminal 50 to transmit a print request for a label, an ID card, or the like to the image forming apparatus 30.

(3) The image forming apparatus 30 sends, to the management server 40, the cartridge ID of the toner cartridge attached to the image forming apparatus and the device ID of the image forming apparatus 30.

(4) The management server 40 authenticates the output source based on whether or not the received device ID and cartridge ID are stored in association with each other. The "output source" refers to a combination of the image forming apparatus and the toner cartridge, but indirectly includes the user of the image forming apparatus 30 (a customer such as a company that has contracted a management service using the management server 40).

(5) When the output source (device ID and cartridge ID stored in association with each other) is authenticated, the management server 40 assigns a unique output source ID to the device ID and the cartridge ID, and this output source ID is transmitted to the image forming apparatus 30.

(6) The image forming apparatus 30 prints print data received from the terminal 50 and the output source ID received from the management server 40 on an output 70. As a result, the output 70 on which the print data and the output source ID are printed is obtained. In FIG. 1B, the output source ID is encoded and printed as a bar code 81.

As described above, the output 70 on which the output source ID is printed is ensured to be printed by the combination of the device ID and the cartridge ID registered in the management server 40. When the operator of the management server 40 has a management contract with the customer, and when the combination of the device ID and the cartridge ID is registered in the management server 40 as illustrated in FIG. 1A, the customer is identified since the management server 40 communicates with the image forming apparatus 30. This ensures that the output 70 is printed by a particular customer. The output 70 on which the output source ID is presumed to be genuine.

Figure 2A:
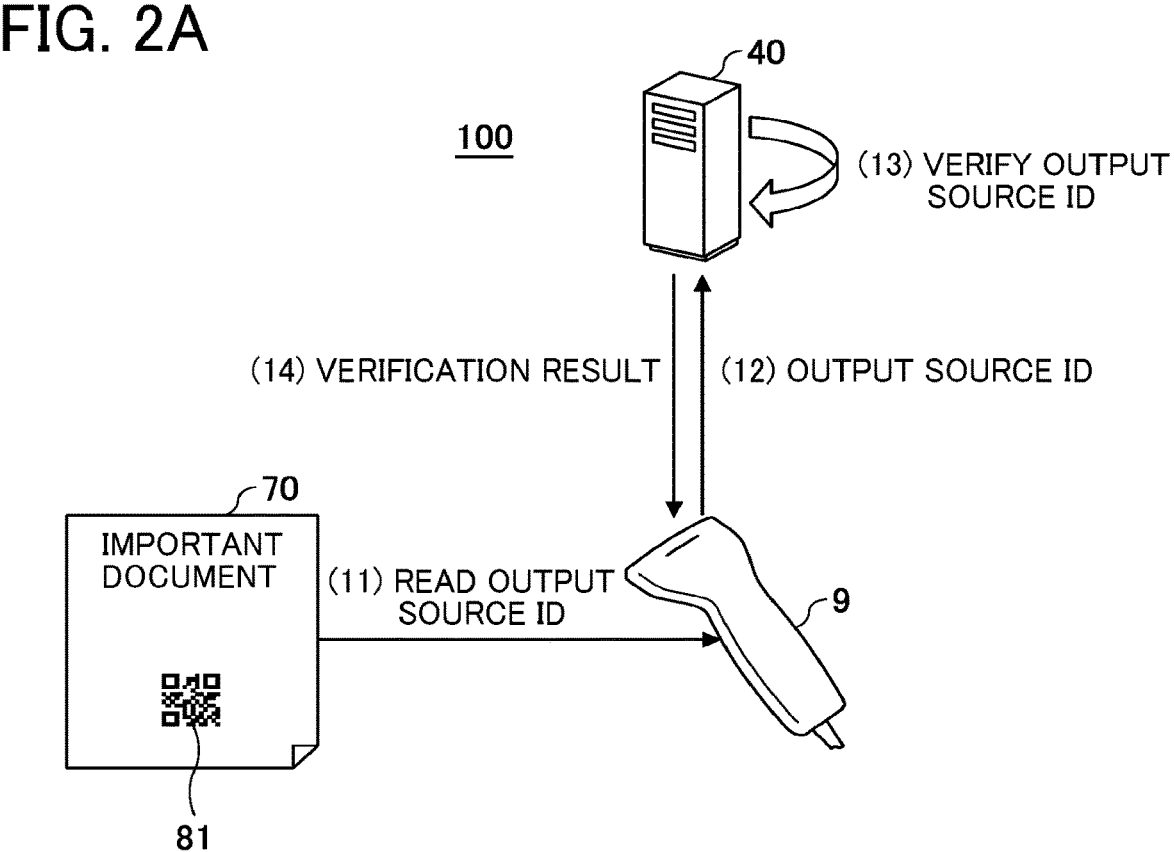
FIG. 2A and FIG. 2B are diagrams illustrating a process of verifying an output of the authenticity determination system.
Figure 2B:
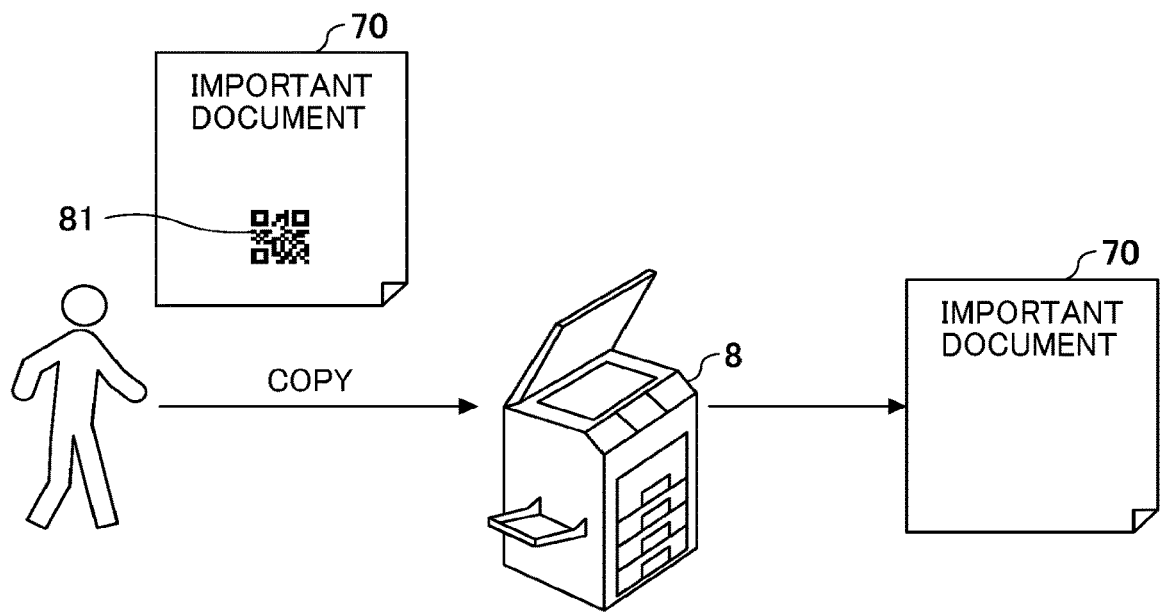

FIG. 2A and FIG. 2B are diagrams illustrating a verification process of an output 70.

(11) FIG. 2A illustrates a process in which the receiver who has properly received the output 70 verifies the output source ID. The receiver reads the bar code 81 in which the output source ID is coded by a reading device 9.

(12) The reading device 9 transmits the output source ID to the management server 40.

(13) The management server 40 verifies the output source ID based on whether the received output source ID is registered. As described above, when the output source ID is registered, the output 70 is highly likely to be genuine. Since the output source ID is linked to the device ID and the cartridge ID, not only where and by whom the output 70 was printed, but also which cartridge was used for printing by which image forming apparatus 30 can be identified.

(14) The management server 40 transmits, to the reading device 9, a verification result indicating whether the output 70 is genuine.

As illustrated in FIG. 1A and FIG. 1B, since the output 70 on which the output source ID is printed is assumed to be genuine, when the output source ID is detected by the reading device 9, the receiver can estimate that the output 70 is genuine. Although a method of using an integrated circuit (IC) chip to determine the authenticity of the output 70 exists, the method of printing by the image forming apparatus 30 can be implemented at lower cost than the method of using the IC chip.

A method of authenticating with only the device ID of the image forming apparatus 30 is conceivable, but because the image forming apparatus 30 is easy to obtain on the market, reliability of the output source is low with only the device ID. In the present embodiment, since the device ID and the cartridge ID are used for authentication, the reliability of the output source can be improved if the delivery of the cartridge is controlled with the above-described management contract or the like.

Also, if the output 70 is copied, it becomes difficult to determine that the output 70 is not genuine since the output source ID is printed on the copy of output 70. However, in the present embodiment, the reading device 9 requests the management server 40 for verification. If the output 70 is copied, since multiple receivers send the same output source ID to the management server 40, the management server 40 can notify the receiver that the output 70 is likely to be copied.

A malicious third party may print the output source ID on the output 70 by imitating a format such as a number of digits of the output source ID or position of alphanumeric characters, but since the imitated output source ID is not registered in the management server 40, the management server 40 can notify the receiver of a verification result (verification failure) that the management server 40 is highly likely to be imitated.

The malicious third party may enter into a contract with the operator of the management server 40 and register the device ID and cartridge ID in the management server 40. In this case, for example, the malicious third party can print an output 70 on which an output source ID is printed. When the receiver reads the output source ID with the reading device 9, the receiver obtains a verification result that the output 70 is genuine, but alternatively the output source ID allows the management server 40 to identify at least identity of the third party holding the output source ID. Since the output source ID guarantees that the output 70 is genuine, the possibility of contracting with the malicious third party can be reduced by strictly checking the identity at the time of contract.

On the other hand, it is effective to make the output source ID invisible to prevent copying or imitation of the output source ID. The general-purpose image forming apparatus 30 cannot copy an invisible transparent image. FIG. 2B illustrates the output 70 copied by a copier 8 when the output source ID is invisible. The bar code 81 in which the output source ID is coded is not printed. In addition, when the output source ID is made invisible, the malicious third party cannot recognize the presence of the output source ID, and therefore imitation becomes difficult.

In addition, special toner and ink (hereinafter referred to as invisible material) are required to make an invisible print. The invisible material that can be mounted in the image forming apparatus 30 is not commercially available and difficult for the malicious third parties to obtain through legitimate sales channels. In addition, even if the malicious third party obtained the invisible material through an unauthorized sales channel, the device ID and the cartridge ID are not registered in association in the management server 40, and the output 70 with the output source ID cannot be printed.

Although a method of using holography or tint block printing to determine the authenticity of the output 70 are also available, holography is expensive because the holography requires a special image forming apparatus 30 and since the tint block printing is visible, design of the output 70 is restricted. In addition, a technique for printing an output source ID which cannot be seen with the naked eye like a digital watermark is available, but alternatively the image forming apparatus 30 can copy the digital watermark. Therefore, the method for determining authenticity according to the present embodiment using the invisible material can provide high reliability as to whether or not the output is genuine at low cost.

Terms Used in Present Disclosure

"Apparatus identification information" is identification information for identifying or designating the image forming apparatus. In the present embodiment, the term "device ID" is used. The device ID may be, for example, a media access control (MAC) address, an internet protocol (IP) address, a combination of a model number and a serial number, or a combination of alphanumeric characters. "ID" is an abbreviation of "identification" and signifies an identifier or identification information. The ID refers to a name, a code, a character string, a numerical value, or a combination of one or more of them, which is used to uniquely distinguish a specific object from a plurality of objects.

"Consumables container identification information" is identification information for identifying or designating a container in which consumables are stored. In the present embodiment, the term "cartridge ID" is used. The consumables are, for example, toner, ink, or a ribbon for thermal transfer. The term "cartridge ID" may also be used for the ink or the ribbon, but other terms may be used.

"Predetermined consumables" refer to consumables related to printing that improves security. The predetermined consumables are, for example, consumables sold only on identification and cannot be obtained easily. At least a customer to which the predetermined consumables have been delivered is recorded in the management server in association with the identification information of the predetermined consumables. In the present embodiment, the predetermined consumables are described by the term "invisible material".

A "consumables container" is a container or a case that contain consumables. In the present embodiment, the consumables container is described by the term "cartridge". The cartridge may or may not be a unit integrated with a printing function such as a photoconductor, as long as the cartridge contains the consumables.

"Information on determination" includes not only a result of the determination but information generated according to the result of the determination. The information on the determination may be the result of the determination. In the present embodiment, an output source ID may be transmitted as the information on the determination. The information on the determination being affirmative is a successful authentication result described below, and the information on determination being negative is a failed authentication result described below.

"Output source identification information" is information for identifying an output source indicating which combination of the image forming apparatus and the consumables an output is printed. The output source identification information may indicate a customer using the image forming apparatus 30. In the present embodiment, the output source identification information is described by the term "output source ID".

"Authenticity determination" means determining whether an object for determination is genuine or fake. There are various targets for the authenticity determination. For example, the authenticity determination of an output on which the output source ID is printed, the authenticity determination of a person who carries the output on which the output source ID is printed, the authenticity determination of a product on which the output with the output source ID printed is attached, and the like.

The term "visible" means capable of being seen by the naked eye and the term "invisible" means not capable of being seen by the naked eye. Invisible does not mean that an image cannot be seen at all, but alternatively the image may be invisible at a first glance, or the image may be impossible to be captured by an imaging device. Transparent toner or ink may be referred to as stealth toner or stealth ink.

<System Configuration>

Figure 3:
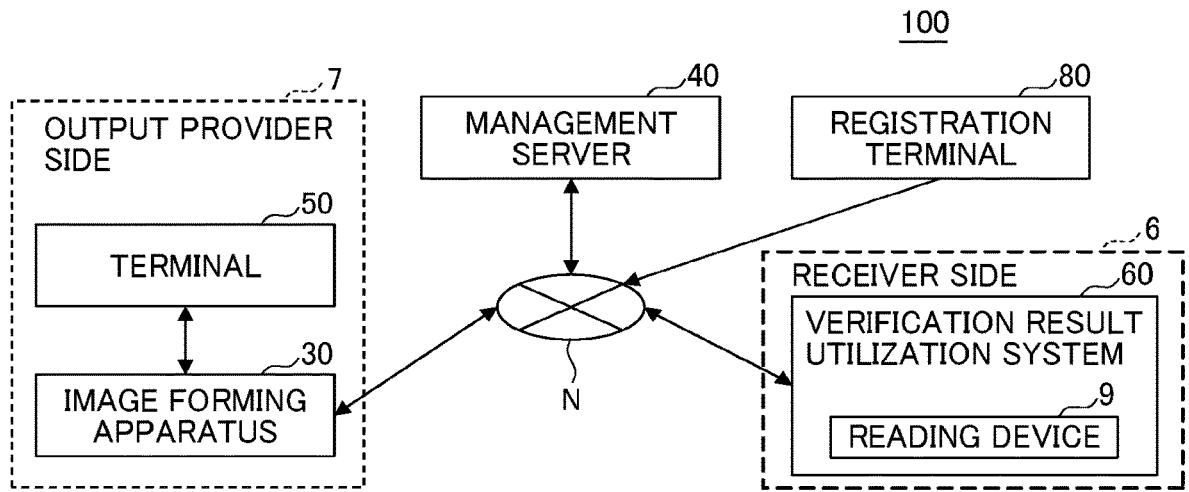
FIG. 3 is a schematic diagram illustrating a configuration of the authenticity determination system.

FIG. 3 is a schematic diagram illustrating a configuration of the authenticity determination system 100 according to the present embodiment. The authenticity determination system 100 includes a terminal 50, an image forming apparatus 30, a management server 40, a registration terminal 80, and a verification result utilization system 60.

The terminal 50 and the image forming apparatus 30 are connected through an internal network or an external network such as the internet. The terminal 50 and the image forming apparatus 30 exist on an output provider side 7. The output provider side 7 prints the output source ID on the output 70 to ensure that the output 70 printed on the output provider side 7 is genuine.

The terminal 50 is an information processing apparatus for the user to print the output 70. The terminal 50 is, for example, a general-purpose personal computer (PC), a tablet terminal, a smartphone or the like. However, the terminal 50 only needs to be able to print the output 70. For example, an electronic whiteboard, a video conference terminal, and the like may be used. The terminal 50 may be a server, and the image forming apparatus 30 may download and print information registered in the server. Further, instead of a user operating the terminal 50 and printing from the image forming apparatus 30, the image forming apparatus 30 may print the information stored in the image forming apparatus 30.

The image forming apparatus 30 forms an image such as characters and figures on a recording medium by using mainly toner, ink or the like. In the present embodiment, the image can be formed with the toner or ink (hereinafter, referred to as a visible material) readable by the naked eye, and further, the image can be formed with the above-described invisible material. The image forming apparatus 30 can form the image on one recording medium with both visible material and invisible material. The image forming apparatus 30 is also possible to form an image with only one of the visible material and the invisible material.

As the invisible material, toner or ink having absorption in a wavelength range of infrared light (about 850 nm) including near infrared light and having low absorption in the wavelength range of visible light (about 400 to 700 nm) can be adopted (Absorptivity of the visible light wavelength range is less than that of the infrared light wavelength range). Such invisible material is transparent (invisible) to the visible light and legible when irradiated with the infrared light. Since the invisible material improves the security of the output, the invisible material can be regarded as the consumables for security.

In addition, the invisible material may be toner or ink that is absorptive of ultraviolet (UV) light and little to visible light. Moreover, the image may be formed with a material that is transparent in a normal state but can be chemically changed and rendered visible by heat, laser, chemicals or the like. Alternatively, information that is difficult to confirm with the naked eye may be formed by an uneven surface. The verification result utilization system 60 to be described below reads the unevenness by, for example, ultrasonic wave or taking an imprint by a light source and photographing with a camera.

Further, the recording medium to be printed by the image forming apparatus 30 may be anything on which toner or ink can be adhered. The toner or ink can be temporarily affixed and then adhered or penetrated. Specific examples thereof include recording media such as paper, recording paper, film, and cloth, electronic components such as piezoelectric elements and circuit boards, and media such as powder layer, and unless otherwise limited, all materials to which the toner or ink adheres are included.

Further, the material "which toner or ink can adhere" may be paper, yarn, fiber, fabric, leather, metal, plastic, glass, wood, ceramic, etc., as long as toner or ink can be at least temporarily affixed.

The image forming apparatus 30 includes, in addition to a printing apparatus using electrophotography technology, a printing apparatus using ink jet technology for discharging droplets, and a printing apparatus for thermally transferring an ink ribbon. The image forming apparatus 30 may be a multifunction peripheral. The "multifunction" of the multifunction peripheral means having a plurality of functions such as an image forming, facsimile transmission and reception, scanning of an original, and copying. The multifunction peripheral may be called an MFP. In the present embodiment, only the image forming function is necessary. The output source ID can also be printed on the output 70 that has been received and printed by facsimile using the invisible material. The image forming apparatus 30 may also be called a printer.

In the authenticity determination system 100, the management server 40, the image forming apparatus 30, and the verification result utilization system 60 are connected through the network N. The network N is assumed to be a general-purpose network such as a local area network (LAN) or the internet. The LAN is, for example, a LAN in a facility such as an office where the image forming apparatus 30 is installed. The network N may further include a virtual private network (VPN) and a wide area Ethernet (registered trademark). The network N may be established by either wired or wireless, and wired and wireless may be combined.

The management server 40 is one or more information processing apparatuses having a communication function (an example of a server in the claims). The management server 40 manages the image forming apparatus 30 and the cartridge in association with each other. Depending on the delivery destination of the cartridge, the output provider side 7 (the customer described above) is also associated with the image forming apparatus 30 and the cartridge. The cartridge is associated with the image forming apparatus 30 at the time of attaching the cartridge to the image forming apparatus 30 or at the time of delivery of the cartridge to the output provider side 7. By associating at the time of delivery, the image forming apparatus 30 and the cartridge can be reliably associated with the output provider side 7. The association can be performed by a customer engineer who delivers the cartridge or maintains the image forming apparatus 30 but may be performed by a person in charge at the output provider side 7.

The assigning of the output source ID is performed at the time of printing the output 70, but alternatively the assigning may also be performed when the image forming apparatus 30 and the cartridge are associated.

Further, the assigning of the output source ID may be performed on the image forming apparatus 30 side. When the image forming apparatus 30 transmits the device ID and the cartridge ID to the management server 40 and the management server 40 registers the device ID and cartridge ID, the management server 40 transmits the authentication success to the image forming apparatus 30. Even if the image forming apparatus 30 assigns an output source ID, the output source ID can be considered as already authenticated. However, it is preferable to ensure uniqueness so that the output source IDs do not overlap.

The management server 40 determines whether or not the output source ID is registered in response to the verification request from the verification result utilization system 60 designating the output source ID and transmits the verification result to the verification result utilization system 60 including whether or not the output source ID is registered.

The registration terminal 80 is an information processing apparatus operated by a customer engineer or the like to register the device ID and the cartridge ID in the management server 40 in association with each other. Specifically, the registration terminal 80 may be the same as the terminal 50. If the image forming apparatus 30 associates the device ID with the cartridge ID when the cartridge is attached, the registration terminal 80 may be omitted.

The verification result utilization system 60 is one or more information processing apparatuses provided with the reading device 9 of the output source ID. The verification result utilization system 60 is a system that determines whether the output 70 is genuine based on the output source ID. The verification result utilization system 60 exists on a receiver side 6. The receiver side 6 is a person who is authorized to receive the genuine output 70. A plurality of receiver sides 6 may exist on the transport route of the output 70. Therefore, multiple verification result utilization systems 60 may exist for the same kind of output 70.

The relationship between the output provider side 7 and the receiver side 6 varies. An example is described below but is not limited thereto.

(i) The output provider side 7 is a shipment origin of a product and the receiver side 6 is a delivery destination of the product. In this case, the output source ID is printed on a product box or a label attached to the product box. The receiver side 6 determines that the product is genuine when the label or the product box is genuine.

(ii) The output provider side 7 is an issuer or a distributor of an admission ticket and the receiver side 6 is an operator of a facility that manages admission using the admission ticket.

(iii) The output provider side 7 is an ID card issuer and the receiver side 6 is a facility controlling access using the ID card. As described in above (ii) and (iii), for example, an access control of a user to a facility that requires certain qualifications such as exhibitions, buildings, companies, amusement halls, stations, etc. can be managed. For example, an ID card for a fixed-term employee who does not require the ID card for a long period can be prepared at low cost. The ID card can be applied also to facilities where certain qualifications are unnecessary.

(iv) The output provider side 7 is a printer and a holder of a document managed by document life cycle management and the receiver side 6 is document monitoring equipment based on the document life cycle management (such as a shredder and a collection box). Collection and discarding of the document can be managed by the output source ID (preferably with the serial number).

(v) The output provider side 7 is an identity confirmation system in a university or for a qualification test and the receiver side 6 is a company that recruit an employee. The company can confirm whether a candidate's identity is genuine. Application can be considered to various certificates, qualification certificates, car verifications, financial customer cards, etc.

(vi) The output provider side 7 is a public transportation that issues ticket and the receiver side 6 is the public transportation that manages passenger's boarding. A magnetic tape stuck to a ticket is used for the same purpose, but alternatively the reading device of the magnetic tape is a contact type, and the cost including maintenance is high. Since the output source ID of this embodiment can be read optically, the cost of the system can be reduced.

(vii) The output provider side 7 is an organization issuing a prepaid card for books and the receiver side 6 is a bookstore. The bookstore can easily determine whether the prepaid card is genuine.

(viii) The output provider side 7 is a pharmaceutical company and the receiver side 6 is a hospital. Doctors and nurses can easily determine if a medicine is genuine.

<Hardware Configuration>

Hereinafter, a hardware configuration of the terminal 50, the management server 40, the registration terminal 80, and the verification result utilization system 60 in the authenticity determination system 100 according to the present embodiment is described.

<Hardware Configuration of Terminal, Management Server, Registration Terminal, and Verification Result Utilization System>

Figure 4:
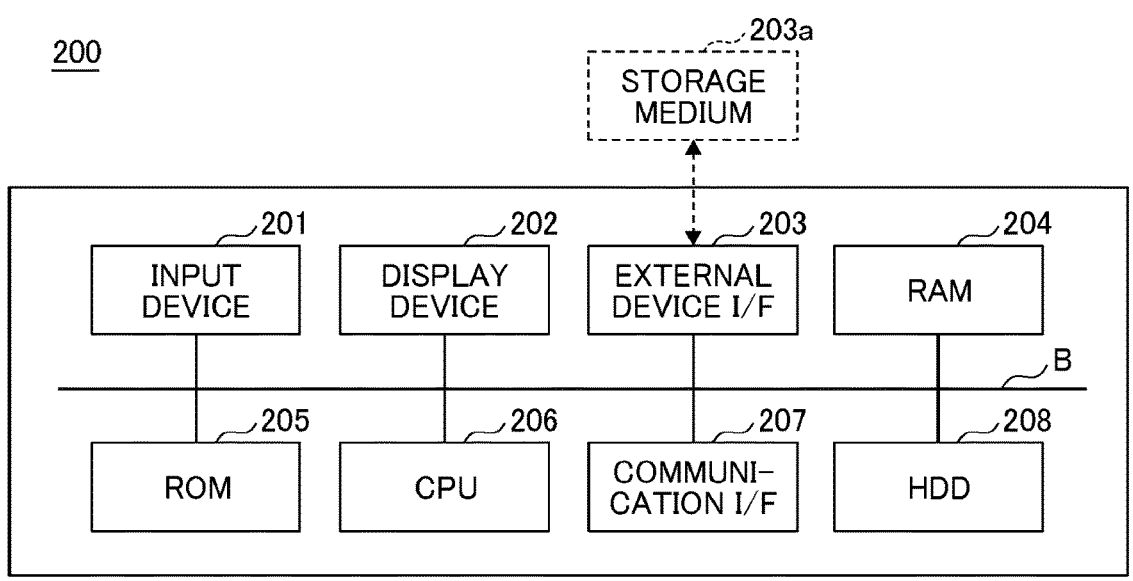
FIG. 4 is a block diagram illustrating a hardware configuration of a computer system.

The terminal 50, the management server 40, the registration terminal 80, and the verification result utilization system 60 are implemented by, for example, a computer system having a hardware configuration illustrated in FIG. 4. FIG. 4 is a block diagram illustrating the hardware configuration of a computer system 200 according to the present embodiment.

As illustrated in FIG. 4, the computer system 200 includes an input device 201, a display device 202, an external device interface (I/F) 203, a random access memory (RAM) 204, a read only memory (ROM) 205, a central processing unit (CPU) 206, a communication I/F 207, and a hard disc drive (HDD) 208, which are connected to one another through a bus B.

The input device 201 includes a keyboard, a mouse, and a touch panel enabling a user to input various operation signals. The display device 202 includes a display and displays results of processing performed by the computer system 200.

The communication I/F 207 is an interface that connects the computer system 200 to an intra-company network, the internet, and the like. The computer system 200 communicates data with external sources through the communication I/F 207.

The HDD 208 is a nonvolatile storage device that stores programs and data. Examples of the programs or data stored in the HDD 208 include an operating system (OS) for controlling an entire operation of the computer system 200 and application software providing various functions on the OS. The HDD 208 manages the programs or data stored therein by a predetermined file system and/or a predetermined database (DB).

The external device I/F 203 is an interface that connects the computer system 200 to extraneous sources. Examples of the extraneous sources include a storage medium 203a. The computer system 200 reads or writes data from or to the storage medium 203a through the external device I/F 203. Examples of the storage medium 203a include a flexible disc, a compact disc (CD), a digital versatile disc (DVD), a secure digital (SD) memory card, and a universal serial bus (USB) memory.

The ROM 205 is a nonvolatile semiconductor memory (storage device), which holds programs and data even after the computer system 200 is turned off as the power is not supplied. The ROM 205 stores programs and data such as a Basic Input/Output System (BIOS), which is activated when the computer system 200 is started up, OS settings, and network settings. The RAM 204 is a volatile semiconductor memory (storage device), which temporarily stores programs and data.

The CPU 206 loads programs or data from a storage device such as the ROM 205 and the HDD 208 onto the RAM 204 and executes processes to control entire operation of the computer system 200 and implement functions of the computer system.

The management server 40 may be compatible with cloud computing but may be a so-called single information processing apparatus. The "cloud computing" refers to internet-based computing where resources on a network are used or accessed without identifying specific hardware resources.

<Hardware Configuration of Image Forming Apparatus>

Figure 5:
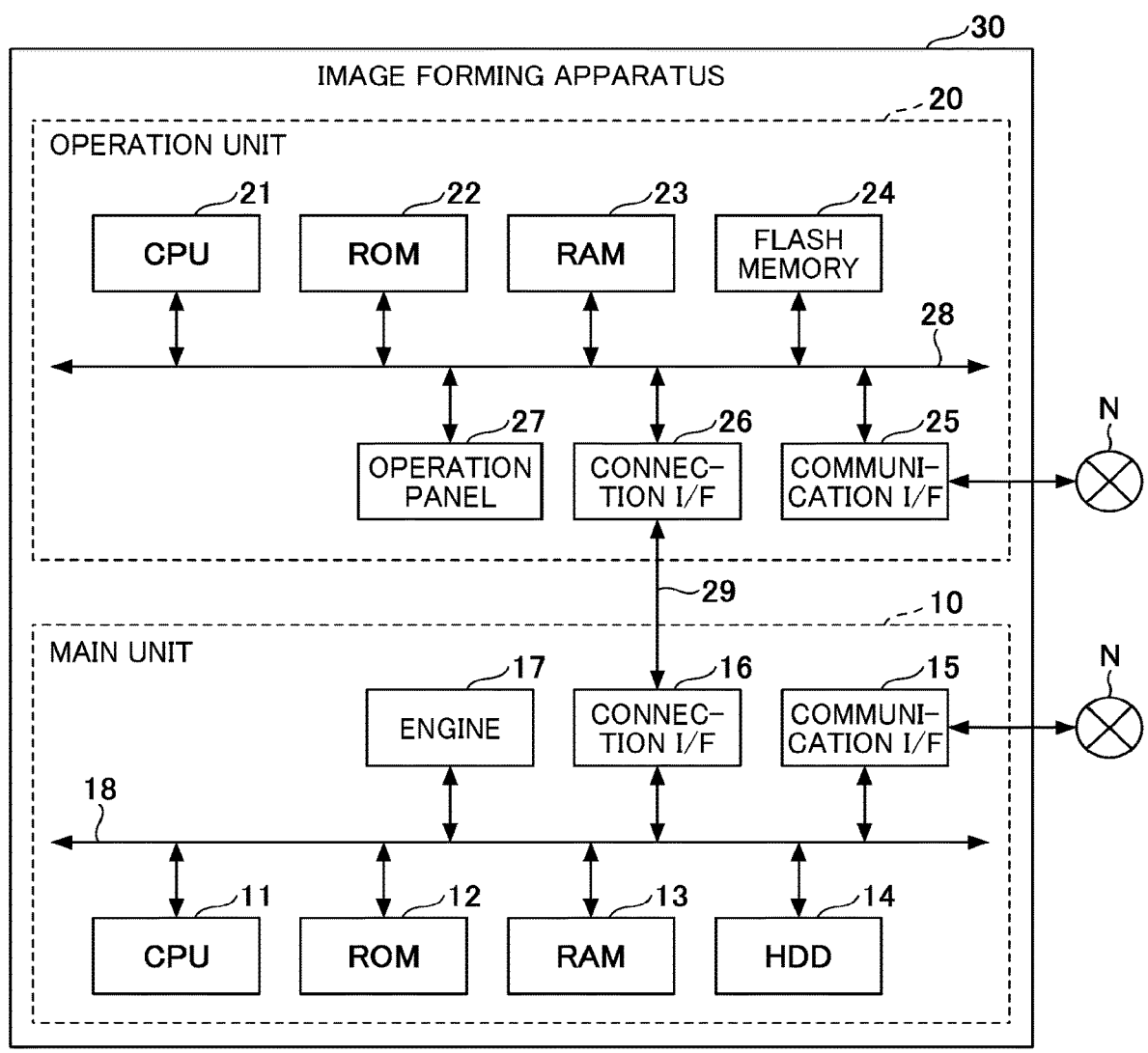
FIG. 5 is a block diagram illustrating a hardware configuration of an image forming apparatus.

FIG. 5 is a diagram illustrating a hardware configuration of the image forming apparatus 30. As illustrated in FIG. 5, the image forming apparatus 30 includes a main unit 10 and an operation unit 20. The main unit 10 and the operation unit 20 are communicably connected to each other through a dedicated communication link 29. The communication link 29 may be in compliance with a universal serial bus (USB) standard. However, any standard, regardless of wired or wireless, may be used as the communication link 29.

The main unit 10 operates in response to an operation received by the operation unit 20. Further, the main unit 10 is communicable with an external device. The main unit 10 is also capable of performing an operation in response to an instruction received from the external device.

The hardware configuration of the main unit 10 is described. As illustrated in FIG. 5, the main unit 10 includes a CPU 11, a ROM 12, a RAM 13, an HDD 14, a communication I/F 15, a connection I/F 16, and an engine 17 which are connected with one another through a system bus 18. FIG. 5 illustrates the configuration in which the main unit 10 includes the HDD 14 as an example, but a configuration without the HDD 14 (for example, a configuration including a flash memory) is also possible.

The CPU 11 controls the main unit 10, by executing a program stored in the ROM 12 or the HDD 14 using the RAM 13 as a work area to implement various functions including a copy function, a scan function, a facsimile function, a print function, etc.

The communication I/F 15 is an interface for connecting the main unit 10 to the network N. The connection I/F 16 is an interface for enabling the main unit 10 to communicate with the operation unit 20 through the communication link 29.

The engine 17 is hardware that performs processing other than general-purpose information processing and communication for implementing the copy function, the scan function, the facsimile function, and the print function. The engine 17 includes, for example, a reading device (image reading unit) that scans and reads an image on a document, a plotter (image forming unit) that performs printing on sheet materials such as a sheet of paper, and a facsimile unit that performs facsimile communication. The engine 17 may further include optional equipment such as a finisher that sorts the printed sheets, and an automatic document feeder (ADF) that automatically feeds documents to be scanned.

A hardware configuration of the operation unit 20 is described hereinafter. As illustrated in FIG. 5, the operation unit 20 includes a CPU 21, a ROM 22, a RAM 23, a flash memory 24, a communication I/F 25, a connection I/F 26, and an operation panel 27 which are connected with one another through a system bus 28. As illustrated in FIG. 5, the operation unit 20 is described by taking the configuration having the flash memory 24 as an example. However, the illustrated configuration is an example and, for example, a configuration without the flash memory 24 is also possible.

<Functions>

Figure 6:
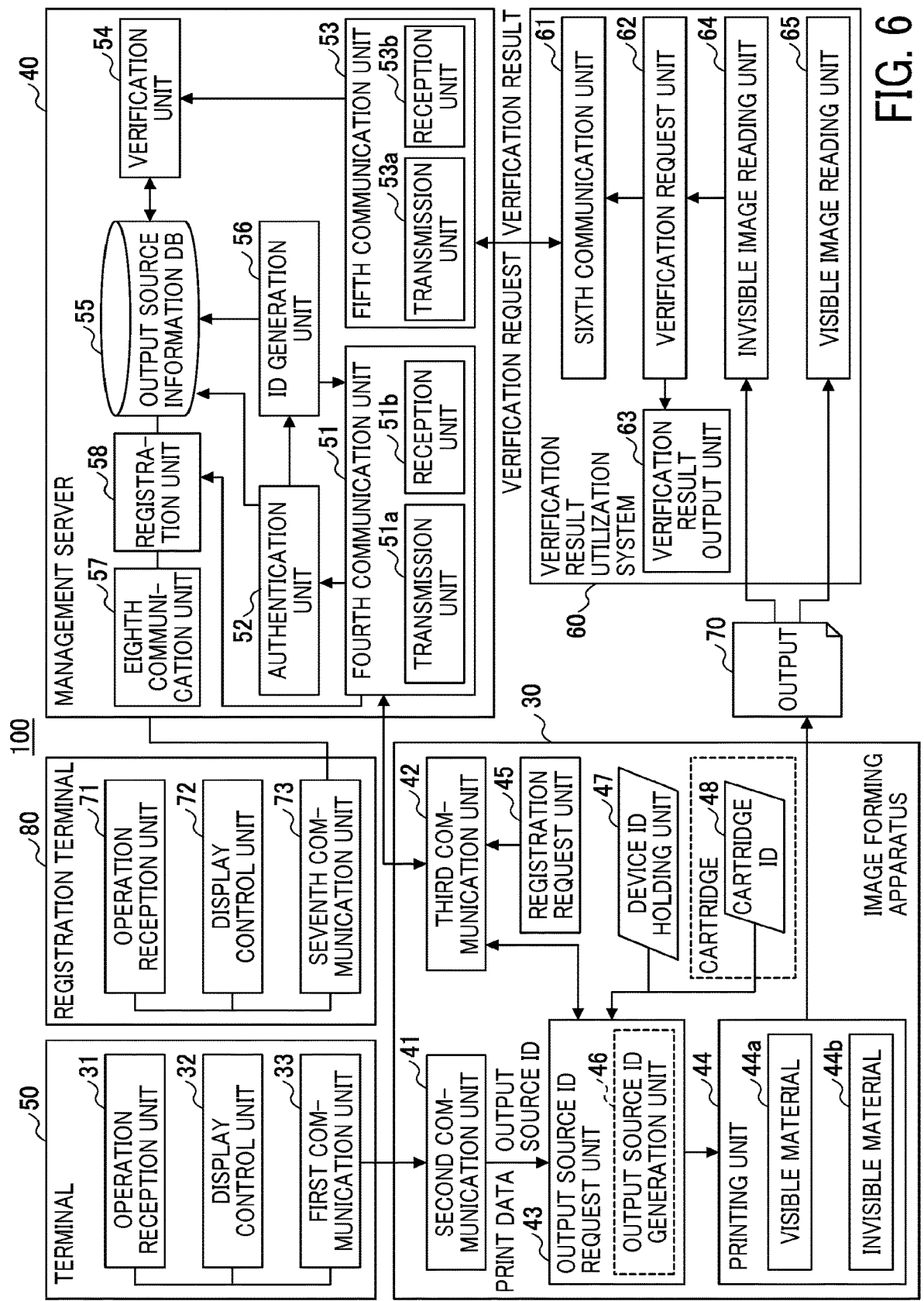
FIG. 6 is a functional block diagram illustrating functions of a terminal, the image forming apparatus, a management server, a registration terminal, and a verification result utilization system included in the authenticity determination system.

FIG. 6 is an example of functional block diagram illustrating functions of the terminal 50, the image forming apparatus 30, the management server 40, the registration terminal 80, and the verification result utilization system 60 included in the authenticity determination system 100.

<Terminal>

The terminal 50 includes an operation reception unit 31, a display control unit 32, and a first communication unit 33. These functional units included in the terminal 50 are functions implemented by operating any of components illustrated in FIG. 4 according to an instruction from the CPU 206 according to a program expanded from the HDD 208 to the RAM 204. The program is distributed from a server for program distribution or distributed as stored in a storage medium.

The operation reception unit 31 accepts various operations on the terminal 50. For example, a print request of print data and a print location of the output source ID are accepted. Contents of the output source ID are determined automatically. In the terminal 50, application software for inputting information may be operating. The application software may print the output source ID, or a printer driver may print the output source ID. Alternatively, the display control unit 32 analyzes screen information described in Hypertext Markup Language (HTML) or the like transmitted from a server, and displays a screen for inputting information, and the operation reception unit 31 may receive an input of information on the screen and the print request of the output source ID.

The display control unit 32 displays a screen of application software or a screen generated by analyzing screen information received from a server on the display device 202. For example, a preview of print data is displayed, and an input field or the like for receiving designation of the print location of the output source ID is displayed.

The first communication unit 33 transmits the print data to the image forming apparatus 30. The printer driver that supports the image forming apparatus 30 is installed in advance in the terminal 50. The printer driver is activated from application software or the like and transmits the print data to the image forming apparatus 30 to make the print request. The print data includes a request to print the output source ID.

<Registration Terminal>

The registration terminal 80 includes an operation reception unit 71, a display control unit 72, and a seventh communication unit 73. These functions may be substantially the same as the terminal 50.

The operation reception unit 71 accepts an operation by a customer engineer or the like on the registration terminal 80. In the present embodiment, the input of the cartridge ID of the delivered cartridge and the device ID of the image forming apparatus 30 used by the customer at the delivery destination is received.

The display control unit 72 analyzes screen information described in HTML or the like transmitted from the management server 40, and displays a screen for inputting the device ID and the cartridge ID.

The seventh communication unit 73 transmits the device ID and the cartridge ID input by the customer engineer or the like to the management server 40.

<Image Forming Apparatus>

The image forming apparatus 30 includes a second communication unit 41, a third communication unit 42, an output source ID request unit 43, a printing unit 44, and a registration request unit 45. These functional units included in the image forming apparatus 30 are functions implemented by operating any of components illustrated in FIG. 5 according to an instruction from the CPU 11 according to a program expanded from the HDD 14 to the RAM 13. The program is distributed from a server for program distribution or distributed as stored in a storage medium. The operation unit 20 may have functions described above.

Further, the image forming apparatus 30 includes a device ID holding unit 47 constructed in the HDD 14 or the ROM 12 illustrated in FIG. 5. In addition, one or more cartridges are attached to the image forming apparatus 30, with the cartridges storing the cartridge ID 48.

The second communication unit 41 transmits and receives various types of information to and from the terminal 50. In the present embodiment, the print data including the print request of the output source ID is acquired from the terminal 50.

The output source ID request unit 43 acquires the device ID held by the device ID holding unit 47 and the cartridge ID 48 held by the cartridge, and transmits the device ID and the cartridge ID to the management server 40 through the third communication unit 42 to request the output source ID. When the management server 40 stores the device ID and the cartridge ID in association with each other, the output source ID request unit 43 acquires the output source ID through the third communication unit 42.

The output source ID request unit 43 may include an output source ID generation unit 46. The output source ID generation unit 46 functions when the image forming apparatus 30, not the management server 40, generates the output source ID. When the management server 40 generates the output source ID, the output source ID generation unit 46 may be omitted.

The output source ID request unit 43 may convert the output source ID into image information such as a bar code or a two-dimensional bar code. By doing the conversion, the verification result utilization system 60 can easily read the output source ID. However, the conversion to the bar code is not mandatory.

The third communication unit 42 transmits and receives various types of information to and from the management server 40. In the present embodiment, the third communication unit 42 transmits the device ID and the cartridge ID to the management server 40 and receives the output source ID from the management server 40.

The printing unit 44 prints the print data with the visible material, and prints the bar code 81 in which the output source ID is coded with the invisible material. As a result, an image formed of the visible material and an image of the output source ID formed of the invisible material are formed on the output 70. However, everything may be printed with visible material. The user takes out the output 70 from the paper output tray and ships the output 70 in a method according to application.

The registration request unit 45 functions when the image forming apparatus 30 registers the device ID and the cartridge ID in the management server 40. Therefore, registration request unit 45 is not required when a customer engineer or the like registers the device ID and the cartridge ID.

<Management Server>

The management server 40 includes a fourth communication unit 51, an authentication unit 52, a fifth communication unit 53, a verification unit 54, an ID generation unit 56, an eighth communication unit 57, and a registration unit 58. These functional units included in the management server 40 are functions implemented by operating any of the components illustrated in FIG. 4 according to an instruction from the CPU 206 according to a program expanded from the HDD 208 to the RAM 204. The program is distributed from a server for program distribution or distributed as stored in a storage medium.

Further, the management server 40 includes an output source information data base (DB) 55 constructed in the HDD 208 or the RAM 204 illustrated in FIG. 4. The output source information DB 55 is described with reference to Table 1A and Table 1B.

TABLE 1A

| Device ID | Cartridge ID | Customer ID |
|-----------|--------------|-------------|
| A001      | B001         | D001        |

Table 1A indicates an example of an association table 301 stored in the output source information DB 55. The association table 301 includes the device ID, the cartridge ID, and a customer ID as data items. The association table 301 is, for example, a table in which the image forming apparatus 30 registered by the customer engineer at the time of delivery of the cartridge, the cartridge, and the customer are associated. The device ID and the cartridge ID are the same as those described above. The customer ID is identification information for identifying or designating a customer such as a company that has contracted to manage the image forming apparatus 30 using the management server 40. The customer ID is associated with information of the customer stored in a customer information DB, and the customer ID identifies an address, name of a person in charge, contact information, etc. of the customer.

TABLE 1B

| Device ID | Cartridge ID | Output Source ID | Verification Count 1 | Serial Number | Verification Count 2 | User ID |
|-----------|--------------|------------------|----------------------|---------------|----------------------|---------|
| A001 | B001 | C001 | 2 | 0001 | 1 | D001 |
| A001 | B001 | C001 | 2 | 0002 | 1 | D002 |
| A001 | B001 | C001 | 2 | 0003 | — | D003 |
| ... | ... | ... | ... | ... | ... | ... |

Table 1B indicates an output source table 302 stored in the output source information DB 55. The output source table 302 has the device ID, the cartridge ID, the output source ID, a verification count 1, the serial number, a verification count 2, and a user ID as data items. The output source ID is set so as not to overlap with the combination of the device ID and the cartridge ID. When the combination of the device ID and the cartridge ID is the same, the output source ID is also the same. The verification count 1 is the number of times the same output source ID has been verified. If the verification count 1 (an example of a first number) is abnormally large, the output 70 may have been copied in large quantity. The serial number (an example of output identification information) is identification information for identifying the output 70 printed by the combination of the device ID and the cartridge ID. The verification count 2 (an example of a second number) is the number of times the serial number has been verified. Since there is only one serial number to an output 70, when the verification count 2 is 2 or more, the output 70 may be copied.

The user ID (an example of user identification information) is identification information for identifying or designating the user who has printed the output 70. The user is an individual employee or the like who printed the output 70 in the customer. Since the user logs in to the image forming apparatus 30, the image forming apparatus 30 identifies the user. The image forming apparatus 30 transmits the user ID to the management server 40 and the user ID is registered in the output source table 302.

The description continues referring back to FIG. 6. The fourth communication unit 51 transmits and receives various types of information to and from the image forming apparatus 30. The fourth communication unit 51 includes a transmission unit 51a and a reception unit 51b. The reception unit 51b receives the device ID and the cartridge ID from the image forming apparatus 30, and the transmission unit 51a transmits the output source ID to the image forming apparatus 30.

The authentication unit 52 authenticates the output source based on whether the device ID and the cartridge ID transmitted from the image forming apparatus 30 are registered in the association table 301. The authentication unit 52 determines that the authentication is successful when the device ID and the cartridge ID transmitted from the image forming apparatus 30 are registered in the association table 301. The authentication unit 52 determines that the authentication is failed when the device ID and the cartridge ID transmitted from the image forming apparatus 30 are not registered in the association table 301.

When the authentication is successful, the ID generation unit 56 generates the output source ID. The ID generation unit 56 sends the output source ID, the device ID, and the cartridge ID to the registration unit 58 for later registration.

The verification unit 54 searches the output source table 302 in response to a verification request designating the output source ID from the verification result utilization system 60 and determines whether the output source ID is registered. The verification unit 54 determines that the verification is successful when the output source ID transmitted from the verification result utilization system 60 is registered in the output source table 302. The verification unit 54 determines that the verification is failed when the output source ID transmitted from the verification result utilization system 60 is not registered in the output source table 302. Furthermore, the number of verification requests (verification count 1) for the same output source ID is counted and registered in the output source information DB 55. If the verification count 1 is equal to or more than the threshold value, then that effect is returned to the verification result utilization system 60. When the verification request for the serial number is transmitted from the verification result utilization system 60, the same process is performed for the serial number.

The fifth communication unit 53 transmits and receives various types of information to and from the verification result utilization system 60. The fifth communication unit 53 includes a transmission unit 53a and a reception unit 53b. The reception unit 53b receives the verification request designating the output source ID, and the transmission unit 53a transmits the verification result to the verification result utilization system 60.

The eighth communication unit 57 transmits and receives various types of information to and from the registration terminal 80. In the present embodiment, the device ID and the cartridge ID are received from the registration terminal 80, and the screen information is transmitted to the registration terminal 80.

The registration unit 58 provides the registration terminal 80 with screen information for registering the device ID and the cartridge ID, and registers the device ID and the cartridge ID transmitted from the registration terminal 80 in the output source information DB 55. Further, the registration unit 58 registers the output source ID, the device ID, the cartridge ID, the serial number, and the user ID in the output source table 302 in association with each other.

<Verification Result Utilization System>

The verification result utilization system 60 includes a sixth communication unit 61, a verification request unit 62, a verification result output unit 63, an invisible image reading unit 64, and a visible image reading unit 65. These functional units included in the verification result utilization system 60 are functions implemented by operating any of the components illustrated in FIG. 4 according to an instruction from the CPU 206 according to a program expanded from the HDD 208 to the RAM 204. The program is distributed from a server for program distribution or distributed as stored in a storage medium.

The sixth communication unit 61 transmits and receives various types of information to and from the management server 40. In the present embodiment, the verification request of the output 70 is transmitted by designating the output source ID, and the verification result is received from the management server 40.

The visible image reading unit 65 is implemented by the reading device 9 such as a scanner, and reads an image printed with the visible material on the output 70. A common reading device can be used as the visible image reading unit 65. The invisible image reading unit 64 is also implemented by the reading device 9 such as a scanner and reads the output source ID from the output 70. The invisible image reading unit 64 has a function which irradiates infrared rays, ultraviolet rays, etc. in order to read the output source ID. As a result, the output source ID of the output 70 can also be rendered visible and read. The reading device 9 may be a line sensor or a two-dimensional image sensor (camera).

The verification request unit 62 sends the output source ID read by the invisible image reading unit 64 to the sixth communication unit 61 and acquires the verification result through the sixth communication unit 61. The verification request unit 62 sends the acquired verification result to the verification result output unit 63.

The verification result output unit 63 outputs the verification result by at least one of a visual output and an audio output. For example, the display device 202 displays verification success or verification failure, and the speaker outputs music indicating the verification success or the verification failure. The verification result may be sent to the person in charge by e-mail.

<Registration Process of Image Forming Apparatus and Cartridge>

Figure 7A:
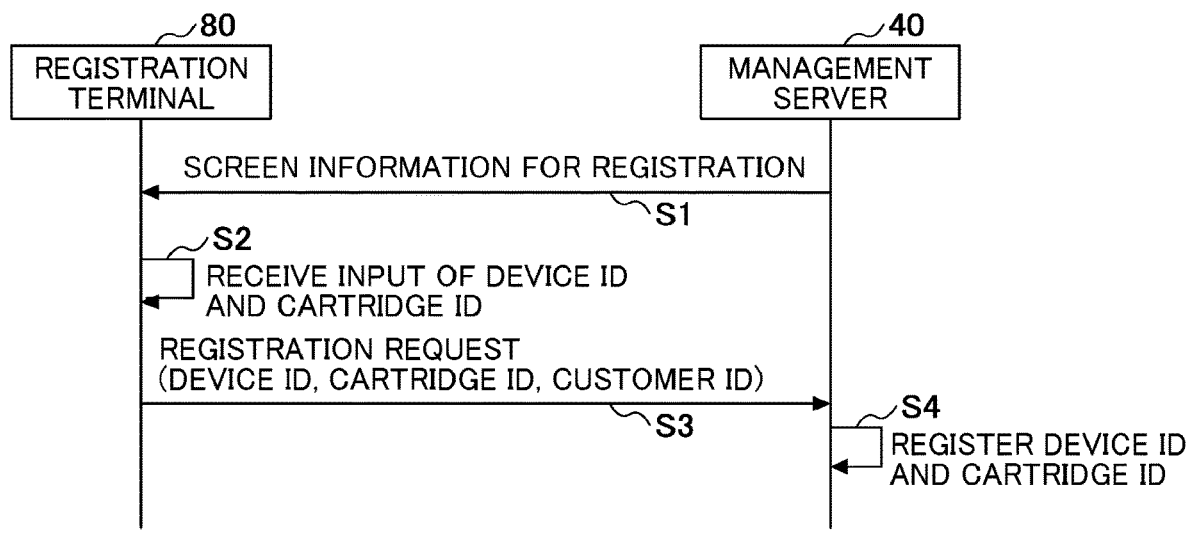
FIG. 7A and FIG. 7B are sequence diagrams illustrating a registration process executed by the management server to register the image forming apparatus and a cartridge in association with each other.
Figure 7B:
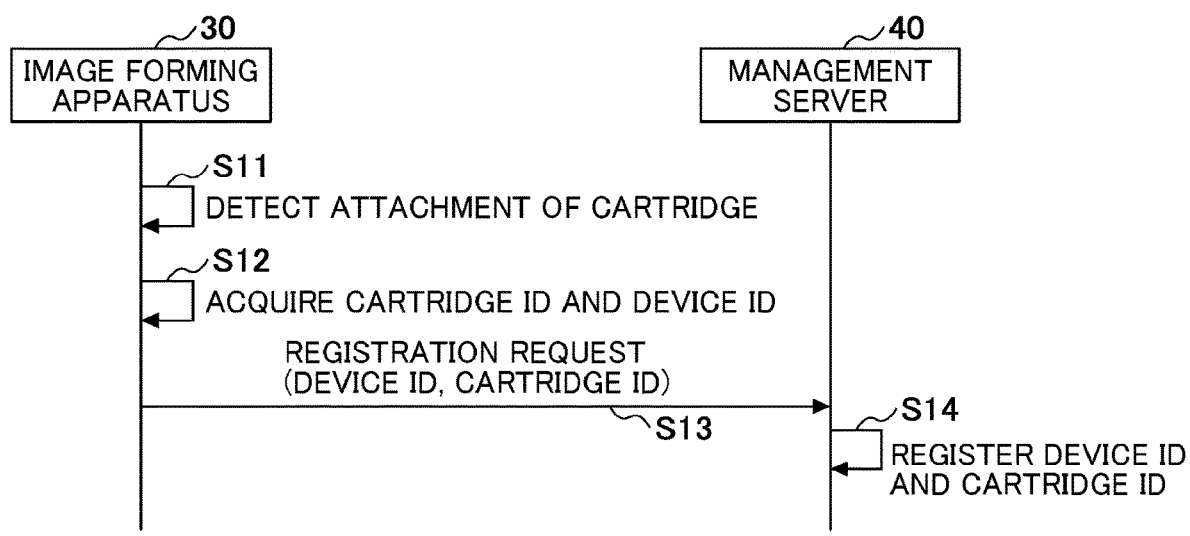

Hereinafter, a registration process of the image forming apparatus 30 and the cartridge executed by the management server 40 is described with reference to FIG. 7A and FIG. 7B. FIG. 7A and FIG. 7B are sequence diagrams illustrating a registration process executed by the management server 40 to register the image forming apparatus 30 and the cartridge in association with each other.

FIG. 7A illustrates a process in which a customer engineer or the like registers from the registration terminal 80. The registration process in FIG. 7A can be performed by the customer engineer or a person in charge of the output provider side 7, but in either case, the device ID and the cartridge ID cannot be registered by a third party without permission, because authentication by the management server 40 (login) is necessary. As a result, reliability of the output source ID and reliability of the authenticity of the output 70 are improved.

S1: The customer engineer delivers a toner cartridge to a customer. When reception of the toner cartridge is completed, the customer engineer operates the registration terminal 80 to communicate with the management server 40, and acquires screen information for registering the device ID and the cartridge ID from the management server 40. The customer engineer may refrain from the above operation at the customer site.

S2: The customer engineer inputs the cartridge ID of the toner cartridge delivered and the device ID of the image forming apparatus 30 to which this cartridge may be mounted. The device ID is a device ID of the image forming apparatus 30 operating at the delivery destination of the cartridge. Generally, when a customer is identified, the device ID of the image forming apparatus 30 used by the customer is also identified. The customer engineer may designate the customer and enter the cartridge ID. The operation reception unit 71 of the registration terminal 80 receives an input of the device ID and the cartridge ID. The cartridge ID is that of the cartridge containing the invisible material. This is because the output source ID is printed with the invisible material. When the output source ID is printed with the visible material, the cartridge ID of the visible material is registered.

S3: The seventh communication unit 73 of the registration terminal 80 transmits a registration request including the device ID and the cartridge ID to the management server 40. The registration request substantially includes the customer ID since the customer is designated.

S4: The eighth communication unit 57 of the management server 40 receives the registration request, and the registration unit 58 registers the device ID and the cartridge ID in association with the customer ID in the association table 301. When the device ID and the cartridge ID are registered, the output source can be considered reliable, since the customer engineer makes registration based on the contract with the customer. When the registration is complete, the verification result utilization system 60 can identify which cartridge of which image forming apparatus 30 of which customer the output 70 has been printed by using the output source ID.

FIG. 7B illustrates a registration process in which the image forming apparatus 30 automatically registers the device ID and the cartridge ID. The management server 40 authenticates the image forming apparatus 30 in advance. That is, the image forming apparatus 30 is identified as belonging to a customer who has a maintenance contract or the like. This is because when any third party can register the device ID and the cartridge ID, the output source cannot be identified.

S11: A customer engineer or a user mounts a toner cartridge on the image forming apparatus 30. The registration request unit 45 of the image forming apparatus 30 detects mounting of the cartridge.

S12: The registration request unit 45 acquires the cartridge ID from the cartridge, and further acquires the device ID from the device ID holding unit 47.

S13: The third communication unit 42 of the image forming apparatus 30 transmits a registration request including the device ID and the cartridge ID to the management server 40. Since the communication between the management server 40 and the image forming apparatus 30 is performed based on the contract with the customer, the customer is identified by the communication between the management server 40 and the image forming apparatus 30. That is, the registration request substantially includes the customer ID.

S14: The fourth communication unit 51 of the management server 40 receives the registration request, and the registration unit 58 registers the customer ID in association with the device ID and the cartridge ID in the association table 301. When the registration is complete, it is possible to identify from which cartridge of which image forming apparatus 30 the output 70 is printed by which customer based on the output source ID.

<Output Print Process>

Figure 8:
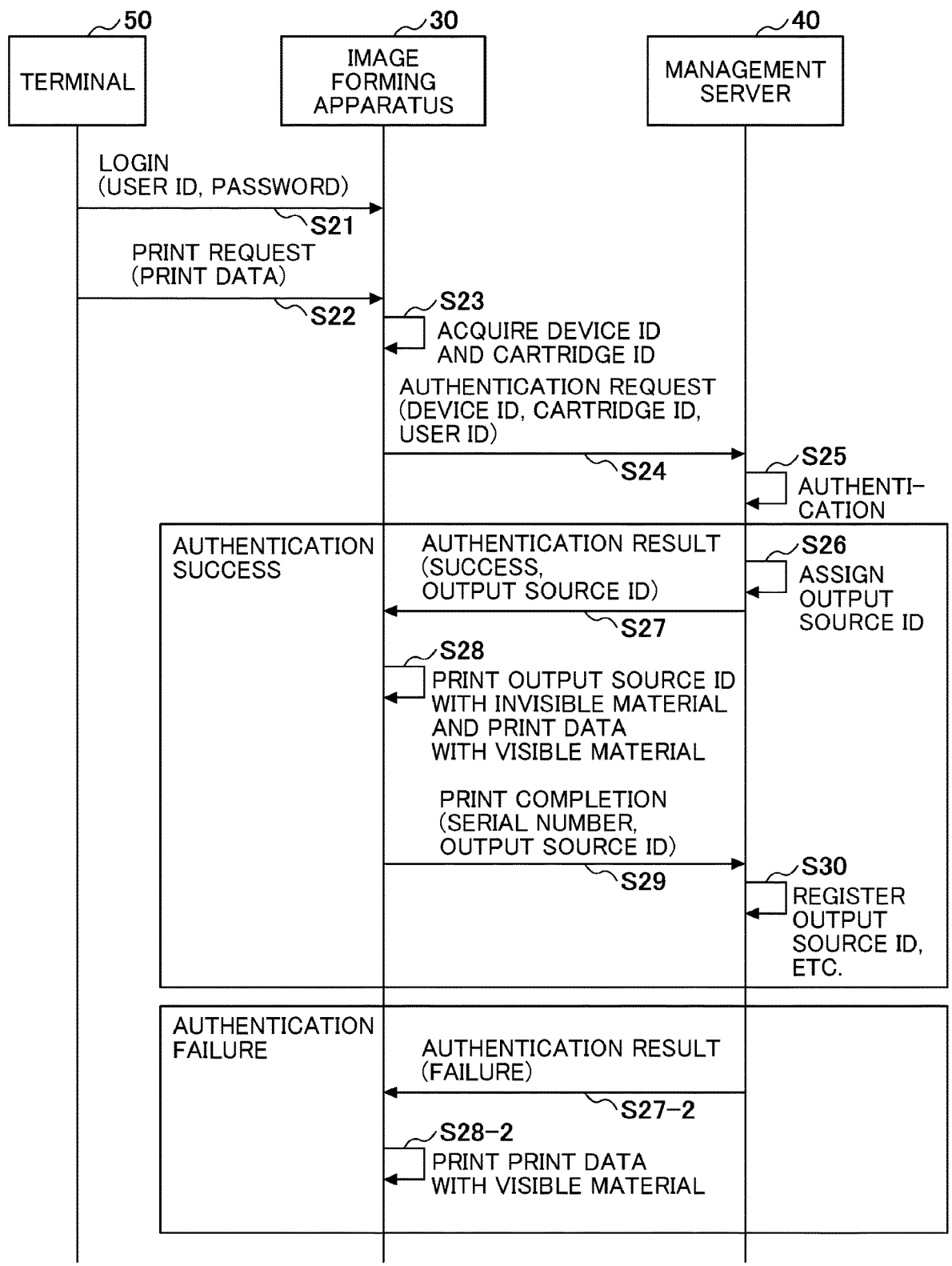
FIG. 8 is a sequence diagram illustrating a print process to print an output after a device identifier (ID) and a cartridge ID are registered in the management server.

FIG. 8 is a sequence diagram illustrating a process to print an output 70 after the device ID and the cartridge ID are registered in the management server 40.

S21: The user of the terminal 50 logs in to the image forming apparatus 30. In the present embodiment, it is assumed that login is permitted, and the image forming apparatus 30 thereby identifies the user ID.

S22: The user transmits a print request from the terminal 50. The operation reception unit 31 of the terminal 50 accepts the user's operation, and transmits the print data to the image forming apparatus 30. The print request includes printing of the print data with the visible material and printing of the output source ID with the invisible material.

S23: The second communication unit 41 of the image forming apparatus 30 receives the print request. In response to receiving the print request, the output source ID request unit 43 of the image forming apparatus 30 acquires the device ID from the device ID holding unit 47 and acquires the cartridge ID 48 from the cartridge.

S24: The output source ID request unit 43 transmits the authentication request designating the device ID and the cartridge ID, through the third communication unit 42 to the management server 40. In the example illustrated in FIG. 8, in order to identify the user who printed the output 70, the user ID is also transmitted.

S25: The reception unit 51b of the fourth communication unit 51 of the management server 40 receives the authentication request. The authentication unit 52 of the management server 40 authenticates the output source based on whether the device ID and the cartridge ID are registered in the association table 301.

When the authentication is successful (determination result is affirmative), steps S26 to S30 are executed, and when the authentication fails (determination result is negative), steps S31 and S32 are executed.

S26: The ID generation unit 56 of the management server 40 generates the output source ID. When the output source ID is already assigned to the combination of the same device ID and cartridge ID, the output source ID is not generated. This is to prevent different output source IDs from being generated for the combination of the same device ID and cartridge ID.

S27: The transmission unit 51a of the fourth communication unit 51 of the management server 40 transmits the authentication result indicating that the authentication is successful and the output source ID to the image forming apparatus 30. The output source ID transmitted by the management server 40 may be encrypted. Encrypting the output source ID makes it difficult for a third party to analyze the output source ID even if the output source ID is read. Since the encryption key is stored in the management server 40, the verification result utilization system 60 or the management server 40 can decrypt the output source ID.

S28: The third communication unit 42 of the image forming apparatus 30 receives an authentication result indicating success together with the output source ID. The output source ID request unit 43 of the image forming apparatus 30 sends the print data and the output source ID to the printing unit 44 because the authentication is successful. Thereby, the printing unit 44 prints the print data with the visible material 44a and prints the output source ID (the bar code 81) with the invisible material 44b.

Furthermore, the printing unit 44 may print the serial number and the user ID with the invisible material 44b. The serial number facilitates detection of a copy of the output 70, since the user ID of the user who printed the output 70 can be identified. The serial number is, for example, a serial number indicating pages printed by one toner cartridge. Alternatively, the serial number may be the total number of print pages from the start of use of the image forming apparatus 30.

The printing unit 44 may refrain from printing depending on the content of the print data. For example, in the case of a confidential item or personal information registered in advance, that effect is output, and printing is stopped.

S29: The third communication unit 42 of the image forming apparatus 30 transmits the print completion notice to the management server 40 designating the serial number and the output source ID.

S30: The reception unit 51b of the fourth communication unit 51 of the management server 40 receives the print completion notice. The registration unit 58 of the management server 40 registers the output source ID, the device ID, the cartridge ID, the serial number, and the user ID in association with each other in the output source table 302. The serial number may be assigned by the management server 40. In this case, the management server 40 transmits the output source ID and the serial number to the image forming apparatus 30 in step S27.

When the management server 40 does not generate the output source ID, the management server 40 does not assign the output source ID in step S26, and only the authentication result (success) is transmitted in step S27. The output source ID generation unit 46 of the image forming apparatus 30 generates an output source ID, preferably inquires the management server 40 about the presence or absence of duplication, and if there is no duplication, the printing unit 44 uses the output source ID for printing. If the output source ID is duplicating, the output source ID may be generated again.

Hereinafter, the case where authentication has failed is described.

S27-2: The transmission unit 51a of the fourth communication unit 51 of the management server 40 transmits, to the image forming apparatus 30, an authentication result indicating that the authentication has failed.

S28-2: The third communication unit 42 of the image forming apparatus 30 receives the authentication result indicating failure. Since the authentication has failed, the output source ID request unit 43 of the image forming apparatus 30 sends only the print data to the printing unit 44. Thereby, the printing unit 44 prints the print data with the visible material. The output source ID is not printed. That is, normal printing is performed without using the invisible material. In this case, it is preferable that the image forming apparatus 30 outputs an error message indicating that the output source ID cannot be printed using the invisible material because the output source ID is not acquired.

As described above, when the combination of the device ID and the cartridge ID is not registered in the management server 40, the output source ID is not printed. Only the image forming apparatus 30 in which the combination of the device ID and the cartridge ID is registered in the management server 40 can print the output source ID. Therefore, it is possible to identify which image forming apparatus 30 of which customer printed with which toner cartridge, and the reliability thereof is high. At the same time, the output 70 on which the output source ID is printed is likely to be genuine.

If the authentication fails, the printing unit 44 may not even perform normal printing that does not use the invisible material. In this case, it is preferable that the image forming apparatus 30 outputs an error message indicating that printing cannot be performed because the output source ID is not acquired.

Also, if the authentication fails, the printing unit 44 may make the image rough. To make the image rough means to lower the resolution (for example, print with 300 dpi instead of 600 dpi). In addition, printing may be performed by reducing the density or making a color image monochrome. In this case, since the image forming apparatus 30 cannot obtain the output source ID, it is preferable to output an error message indicating that the printing is performed with lower resolution.

<Example of Output>

Figure 9:
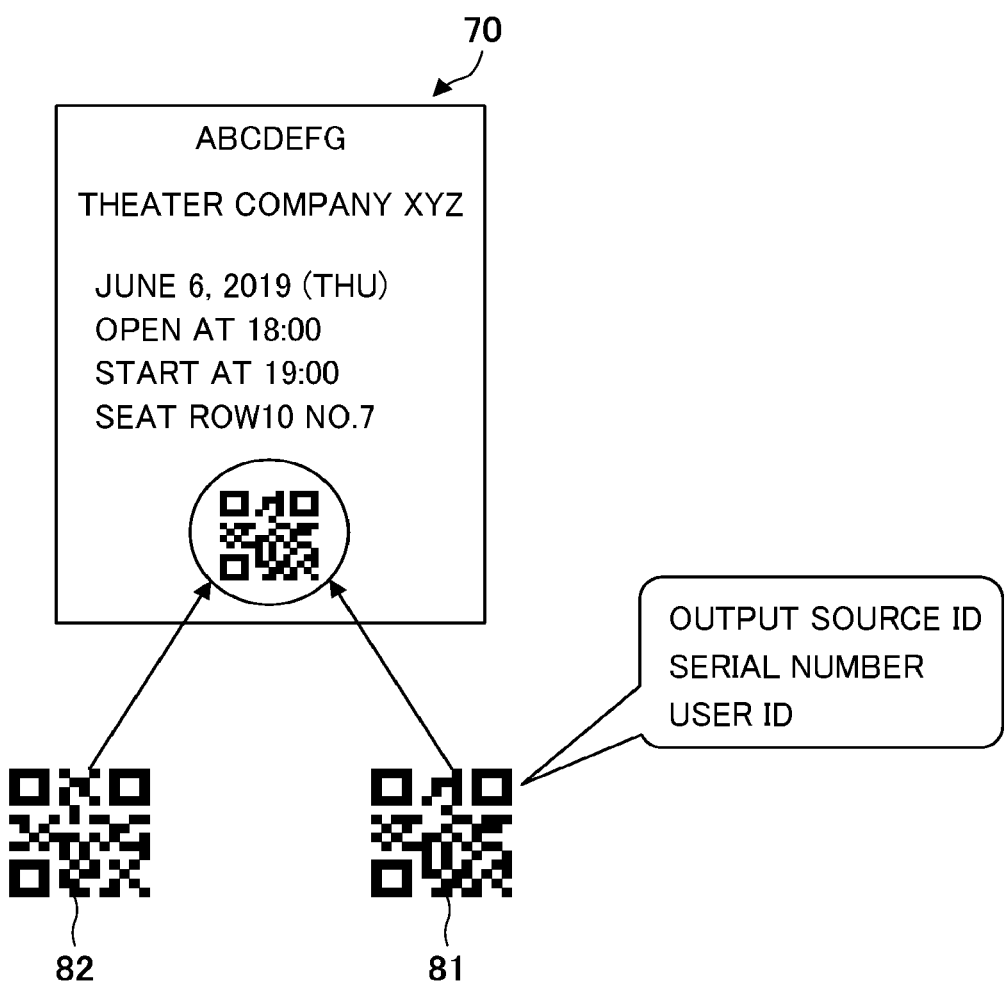
FIG. 9 is a diagram illustrating an example of the output.

FIG. 9 is a diagram illustrating an example of the output 70. In FIG. 9, an admission ticket for a play is illustrated as an example of the output 70, and the bar code 81 in which the output source ID is coded is printed at the bottom of the output 70. In this output 70, the bar code 81 printed with the invisible material is printed over a bar code 82 printed with the visible material. Although the bar code 81 printed with the invisible material is inherently invisible, the bar code 81 is illustrated in black in FIG. 9. The bar code 81 is similarly illustrated in black in the other figures.

The bar code 82 printed with the visible material is encoded with information with little secrecy that can also be displayed as characters, such as a title of the play and a date and time. The bar code 81 printed with the invisible material includes the encoded output source ID. As a result, the output source ID is not copied even when the admission ticket is copied, the user can find out that the visible bar code 82 should be held over the reading device 9 for admission and simultaneously the invisible output source ID is held over the reading device 9, and the visible bar code 82 conceals the presence of the output source ID (invisible bar code 81).

Note that the printing location of the output source ID is an example, and the output source ID may be printed anywhere since the output source ID is invisible. Further, the bar code 81 printed with the invisible material may include the serial number, the user ID, and the like, in addition to the output source ID.

<Verification Process>

Figure 10:
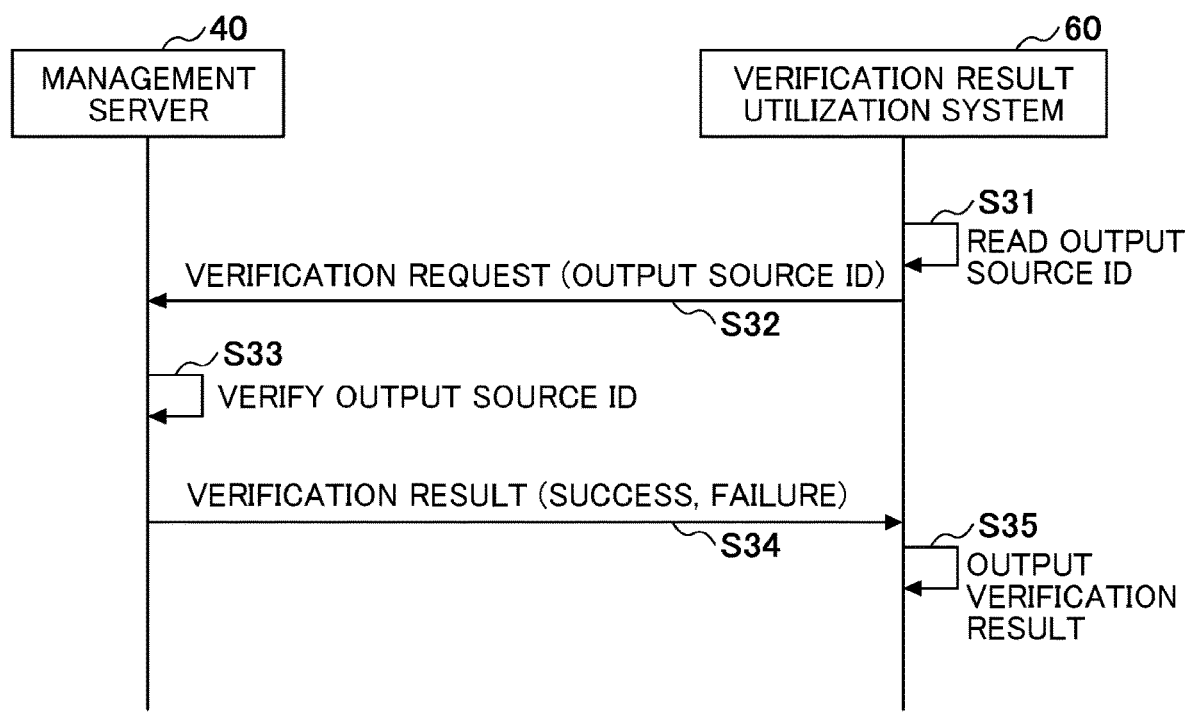
FIG. 10 is a sequence diagram illustrating a verification process of an output source ID executed by the verification result utilization system.

A verification process of the output source ID is described with reference to FIG. 10. FIG. 10 is a sequence diagram illustrating the verification process of the output source ID executed by the verification result utilization system 60.

S31: When the receiver of the output 70 holds the output 70 over the reading device 9, the invisible image reading unit 64 of the verification result utilization system 60 reads the output source ID. The visible image may or may not be read.

S32: The verification request unit 62 of the verification result utilization system 60 transmits a verification request designating the output source ID to the management server 40 through the sixth communication unit 61.

Figure 11A:
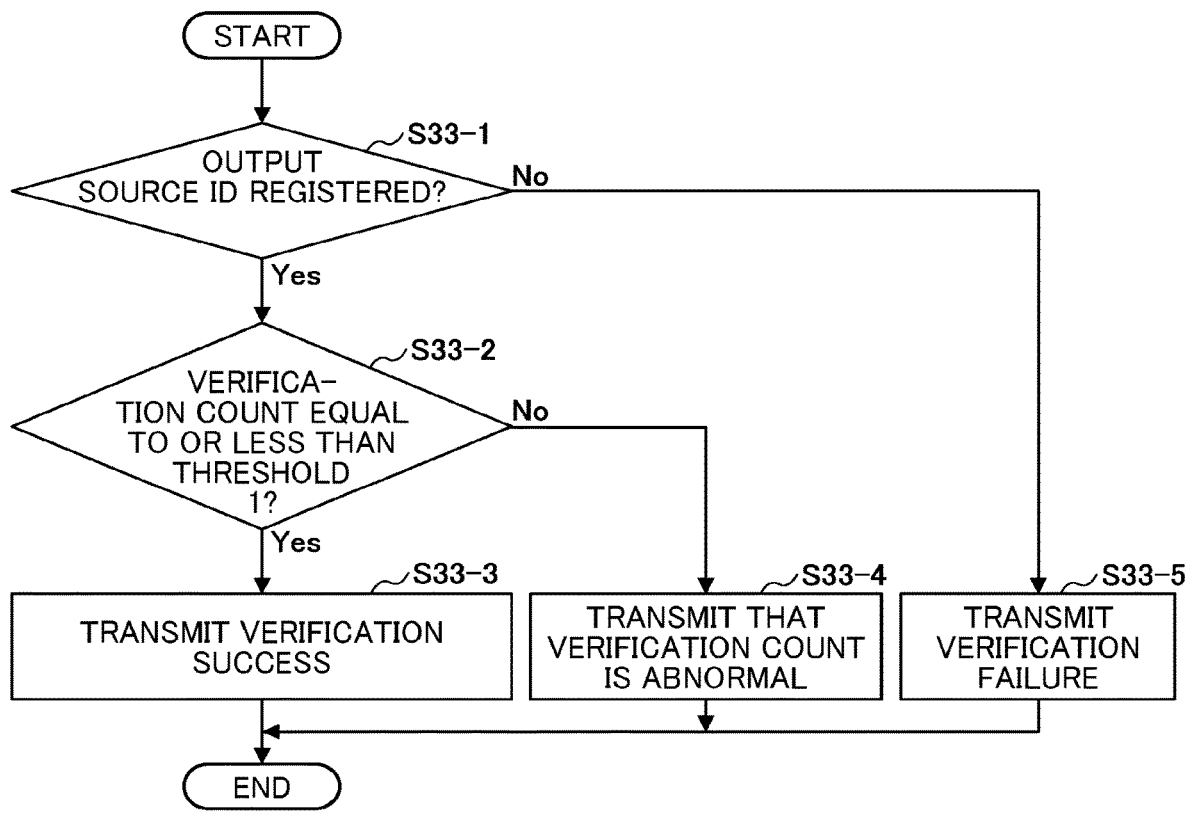
FIG. 11A and FIG. 11B are flowcharts illustrating details of verification process.
Figure 11B:
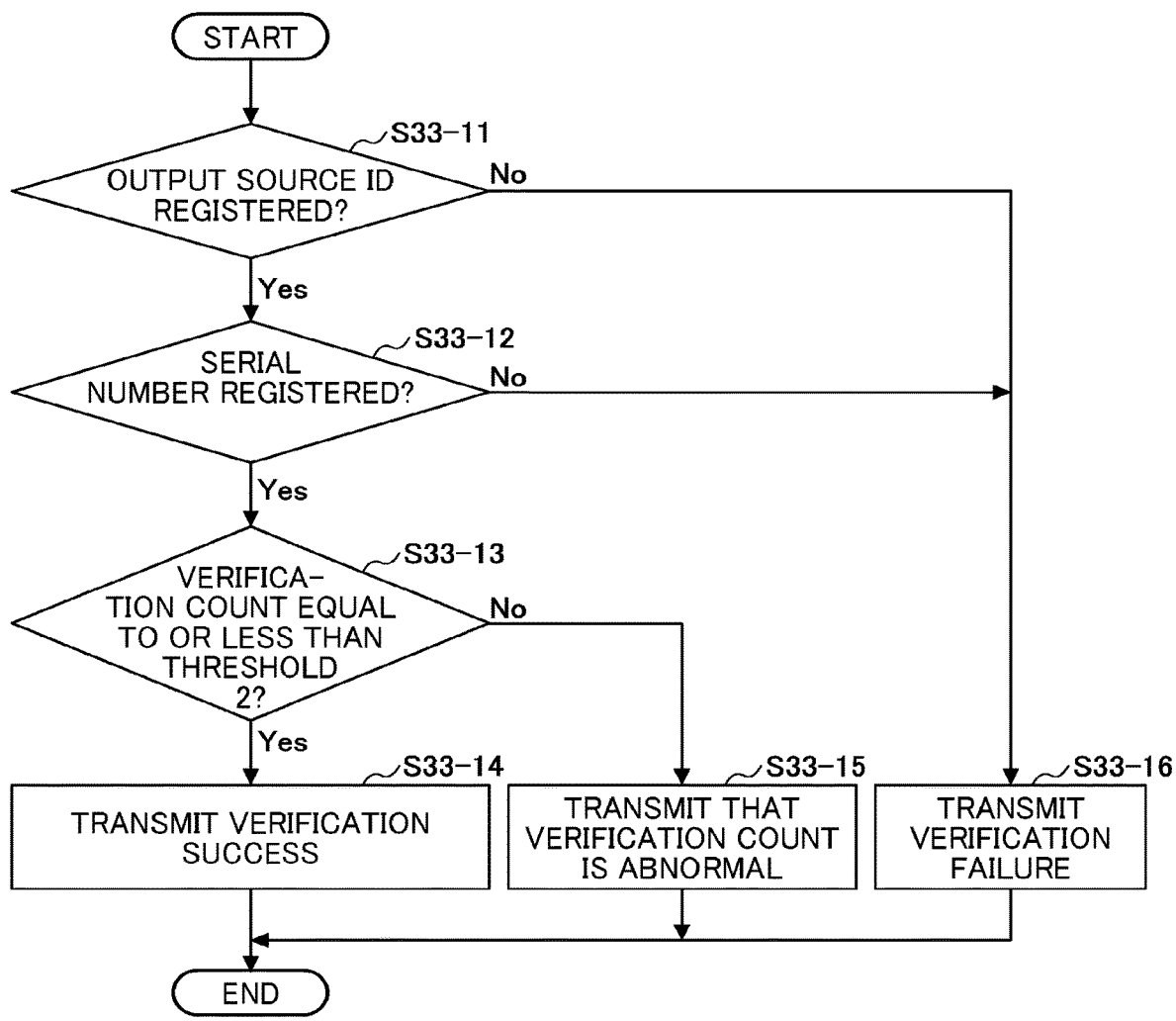

S33: The reception unit 53b of the fifth communication unit 53 of the management server 40 receives the verification request. The verification unit 54 verifies the output source based on whether or not the output source ID is registered in the output source table 302 of the output source information DB 55. Details of the verification process are illustrated in FIG. 11A and FIG. 11B. The verification unit 54 increments the verification count 1 and the verification count 2 at the time of verification.

S34: The transmission unit 53a of the fifth communication unit 53 of the management server 40 transmits a verification result to the verification result utilization system 60.

S35: The sixth communication unit 61 of the verification result utilization system 60 receives the verification result. The verification result output unit 63 outputs the verification result by visual or by audio.

FIG. 11A and FIG. 11B are flowcharts illustrating details of the verification process. FIG. 11A illustrates a verification process when the output source ID is printed on the output 70 but alternatively the serial number is not printed.

The verification unit 54 determines whether the output source ID is registered in the output source table 302 of the output source information DB 55 (S33-1).

If the determination in step S33-1 is No, the verification unit 54 transmits a verification failure to the verification result utilization system 60 through the fifth communication unit 53 (S33-5).

If the determination in step S33-1 is Yes, the verification unit 54 compares the verification count 1 with a threshold 1 and determines whether the verification count 1 for the output source ID is equal to or less than the threshold 1 (S33-2). After the determination, the verification unit 54 increases the verification count 1 by one.

When the determination in step S33-2 is No, there is a possibility that the output 70 has been copied. The verification unit 54 reports an abnormality in the verification count based on the comparison result (an example of information on a comparison result) to the verification result utilization system 60 through the fifth communication unit 53 (S33-4).

When the determination in step S33-2 is Yes, the verification unit 54 transmits the verification success (an example of the information on the comparison result) to the verification result utilization system 60 through the fifth communication unit 53 (S33-3).

The threshold 1 (an example of a first threshold) may be the number of pages of the output 70 that can be printed with one cartridge. When the output 70 is printed more than the number of prints that can be printed with one cartridge, the output 70 is likely to be copied.

Thus, the output source can be verified based on whether or not the output source ID is registered. Further, even if the output source ID is registered, the copy of the output 70 can be detected by the verification count.

FIG. 11B illustrates a verification process when the output source ID and the serial number are printed on the output 70.

The verification unit 54 determines whether the output source ID is registered in the output source table 302 of the output source information DB 55 (S33-11).

When the determination in step S33-11 is No, the verification unit 54 transmits a verification failure to the verification result utilization system 60 through the fifth communication unit 53 (S33-16).

When the determination in step S33-11 is Yes, the verification unit 54 determines whether the serial number transmitted from the verification result utilization system 60 is registered in the output source table 302 (S33-12).

When the determination in step S33-12 is No, the verification unit 54 transmits a verification failure to the verification result utilization system 60 through the fifth communication unit 53 (S33-16).

When the determination in step S33-12 is Yes, the verification unit 54 compares the verification count 2 with a threshold 2 and determines whether the verification count 2 for the serial number is less than or equal to the threshold 2 (S33-13). After the determination, the verification unit 54 increases the verification count 1 and the verification count 2 by one.

When the determination in step S33-13 is No, there is a possibility that the output 70 has been copied. The verification unit 54 reports that there is an abnormality in the verification count 2 based on the comparison result (an example of the information on the comparison result) to the verification result utilization system 60 through the fifth communication unit 53 (S33-15).

When the determination in step S33-13 is Yes, the verification unit 54 transmits the verification success (an example of the information on the comparison result) to the verification result utilization system 60 through the fifth communication unit 53 (S33-14).

Note that the threshold 2 (an example of the second threshold) can be 0 (zero) at the minimum. This is because there is a possibility that the serial number may be copied if the serial number has been verified even once since the serial number is unique.

As described above, when the serial number is printed on the output 70, not only the output source can be verified but also a copy of the output 70 can be easily detected. It is effective when there should be only one output 70. For example, it is effective when the output 70 is an amusement park ticket or the like.

<Other Information Encoded in Bar Code Printed by Invisible Material>

The bar code 81 printed by the invisible material may include other information besides the output source ID, the serial number, and the user ID. The following describes some information that may be usefully included in the bar code 81 printed by the invisible material.

<Product Number and Destination>

Figure 12:
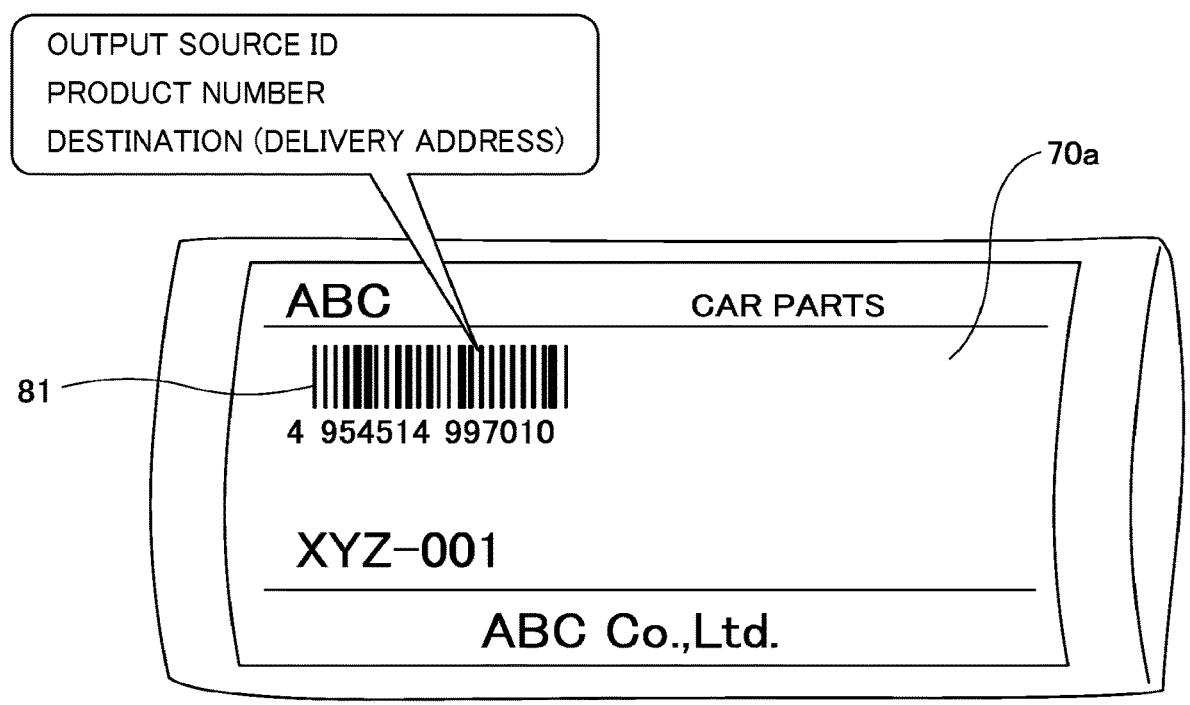
FIG. 12 is a diagram illustrating a product label as an example of printed output.

FIG. 12 illustrates an example of information contained in the bar code 81 printed by the invisible material. Since it is less necessary for the user ID to be printed on a label of a product, the user ID is omitted in FIG. 12. A product number (an example of product identification information) is used as a substitute for the above serial number.

FIG. 12 illustrates a product label 70a printed as an output 70. The bar code 81 on the product label 70a is printed with the invisible material and includes an output source ID, a product number, and a destination (or a delivery address). The product number is information for uniquely identifying the product. The destination is delivery destination information indicating a delivery address of the product.

Here, it is assumed that the destination of the label 70a is forged. That is, a malicious third party has changed the destination to deliver a low-quality copy product without telling. The product number is difficult for a third party to forge since the product number is, for example, affixed to the product. When the verification result utilization system 60 reads the bar code 81, the product number and the destination (or delivery destination store) are decoded. A verification result utilization system 60A having received the product at a destination A transmits the product number and the destination to the management server 40. A verification result utilization system 60B that has received the product at another destination B transmits the product number and the destination to the management server 40. The management server 40 can estimate that the products delivered to at least one of the destinations may not be genuine, since the product of the same product number is detected at another destination. The management server 40 notifies each of the verification result utilization system 60A and the verification result utilization system 60B that there is a possibility that the product number and the product are not genuine.

Figure 13:
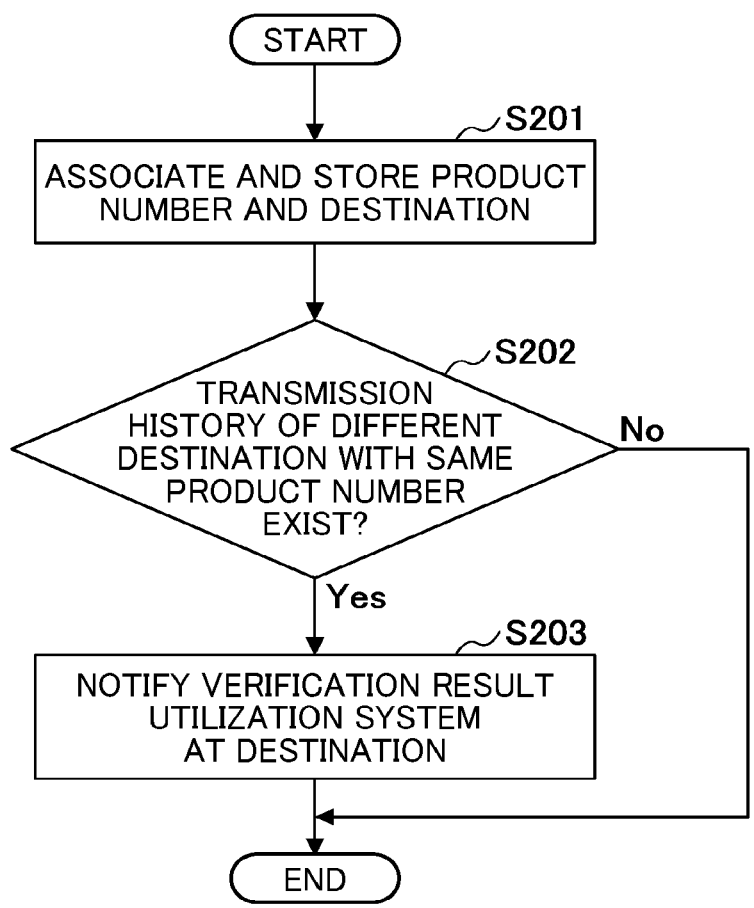
FIG. 13 is a flowchart illustrating a process in which the management server determines whether a destination has been forged.

FIG. 13 is a flowchart illustrating a process in which the management server 40 determines whether a destination has been forged. The verification process based on the output source ID is omitted in FIG. 13 since the process may be the same as in FIGS. 10, 11A, and 11B.

The reception unit 53b of the fifth communication unit 53 of the management server 40 receives the product number and the destination from the verification result utilization system 60. The verification unit 54 associates and stores the received product number and destination (S201).

The verification unit 54 determines whether the transmission histories of different destinations with the same product number are recorded (S202).

When the determination in step S202 is Yes, the verification unit 54 notifies the verification result utilization system 60 that has transmitted the product number and the destination in the past that there is a possibility that a received product may not be a genuine product (S203).

Therefore, by finding the unique product number at another place, the output 70 (in this case, the product) can be determined as not genuine.

The same determination can be made by using a serial number instead of the product number. Also, the serial number may be the serial number of the output 70 or the serial number of the product.

<Security Level>

Figure 14:
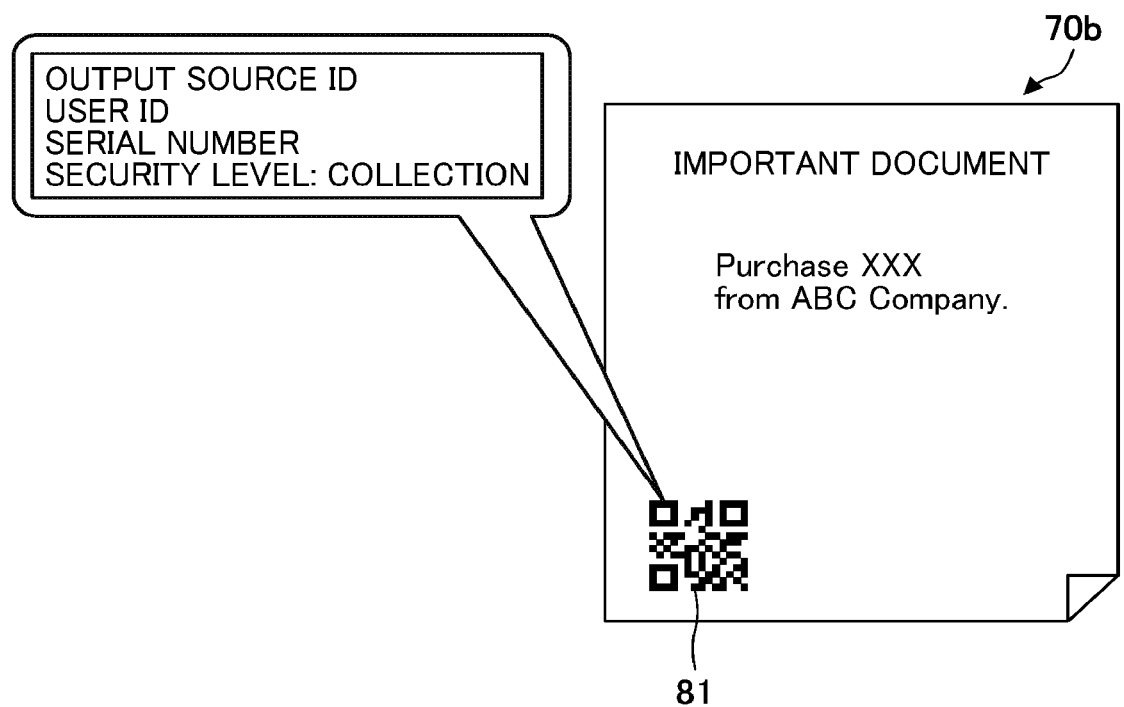
FIG. 14 is a diagram illustrating an important document as an example of printed output.

FIG. 14 illustrates an important document 70b printed as an output 70. The bar code 81 printed by the invisible material is on the important document 70b, and includes an output source ID, a user ID, a serial number, and a security level. The security level is similar to a degree of secrecy of a document. A document life cycle is managed based on the security level. For example, the security level is classified as follows. The security level "discard" indicates a document needs to be discarded using a shredder. The security level "collection" indicates a document needs to be collected in a collection box. The security level "copy inhibit" indicates copying of a document by the image forming apparatus is prohibited. The security level is managed by the management server 40, and the shredder or the collection box can notify the management server 40 of the serial number read from the important document 70b to monitor whether the management according to the security level has been performed.

The security level such as "discard", "collect", or "copy inhibit" and a state such as "completed" or "not completed" are registered in the output source table.

Since the user inputs the security level to the terminal 50 when printing the output 70 (or the image forming apparatus 30 automatically sets the security level based on an attribute of the user, etc.), when the image forming apparatus 30 transmits the security level to the management server 40, the management server 40 registers the security level in association with the output source ID.

Also, if the output 70 has been copied (if permitted by the security level), the management server 40 copies a record of the output source table 302 and replaces the user ID with the user ID of the user that copied the output 70 (A user can be easily identified since log in to the image forming apparatus 30 is necessary). As a result, not only the user who printed the document but also the user who has copied and holding the document can be identified, and the document life cycle management becomes easier.

Figure 15:
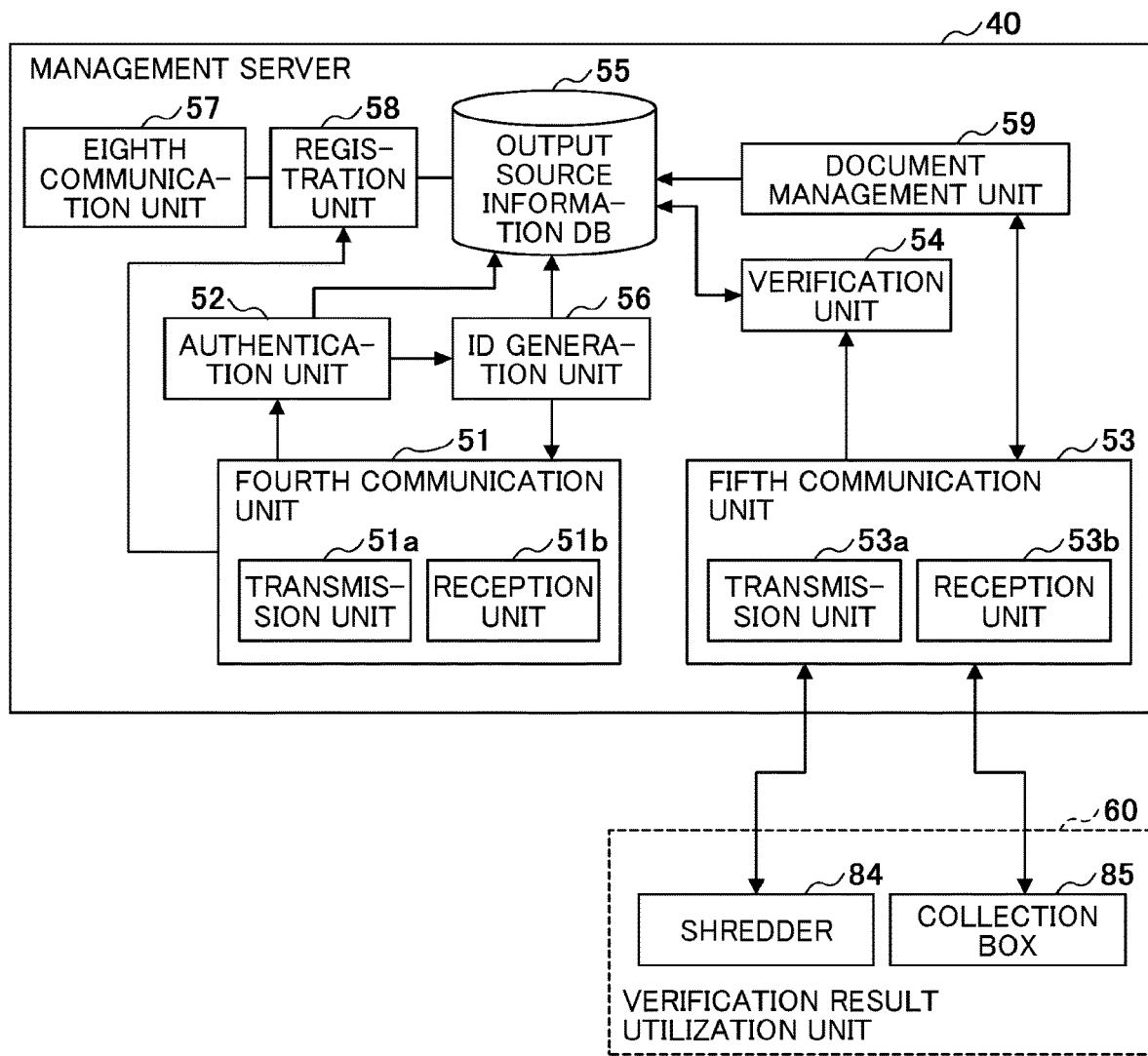
FIG. 15 is a block diagram illustrating functional configuration of a management server that supports security level management.

FIG. 15 is a block diagram illustrating a functional configuration of the management server 40 supporting security level management. In FIG. 15, the management server 40 is connected to a shredder 84 and a collection box 85. Similar to the verification result utilization system 60, the shredder 84 and the collection box 85 transmit the information (output source ID, user ID, serial number, security level, etc.) decoded from the bar code 81 printed with the invisible material to the management server 40.

The management server 40 illustrated in FIG. 15 includes a document management unit 59. The document management unit 59 identifies the output 70 based on the serial number received from the shredder 84 and the collection box 85, and updates the output source information DB 55. The security level is set to be completed when an output with security level collection is collected. Similarly, the security level is set to be completed when an output with security level discard is discarded (shredded).

Figure 16:
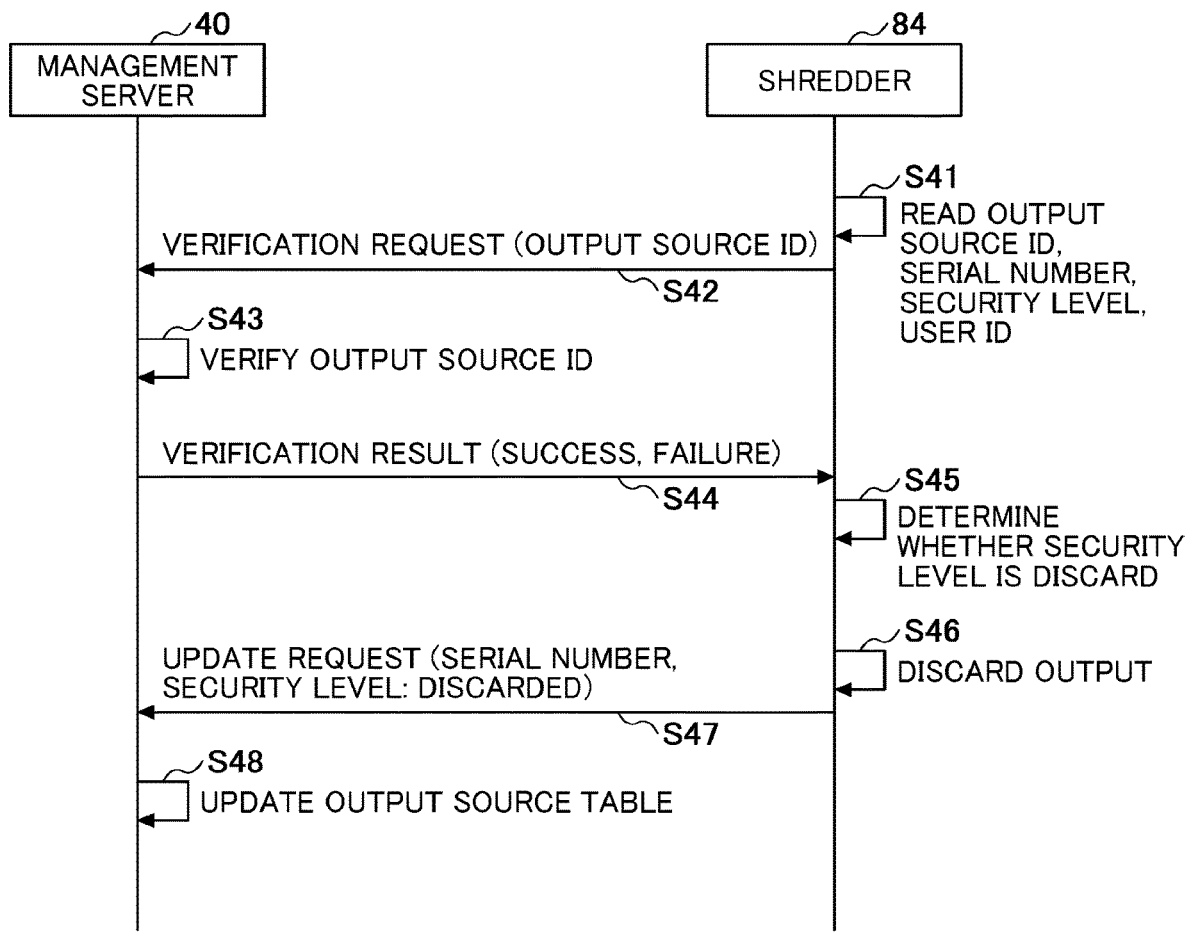
FIG. 16 is a sequence diagram illustrating a process of discarding the output.

FIG. 16 is a sequence diagram illustrating a process of discarding the output 70.

S41: When the user sets the output 70 to the shredder 84, the shredder 84 reads the bar code 81 printed by the invisible material and decodes the output source ID, the user ID, the serial number, and the security level.

S42 to S44: The management server 40 verifies the output source ID in the same manner as described above and transmits the verification result to the shredder 84. Here, verification is assumed to be successful. If the verification is not successful, there is a possibility that the output is not genuine in the first place, and the user takes appropriate action, such as reporting to a department in charge.

S45: Next, the shredder 84 determines whether the security level is "discard". This is because the shredder 84 is a device to discard the output 70. As a result, the shredder 84

TABLE 2

| Device ID | Cartridge ID | Output Source ID | Serial Number | User ID | Security Level | |
|---|---|---|---|---|---|---|
| A001 | B001 | C001 | 0001 | D001 | Collect | Not Completed |

Table 2 illustrates an example of the output source table 302 including the security level. The output source table 302 of Table 2 includes a data item "security level" in addition to Table 1B. The verification count 1 and the verification count 2 are omitted in Table 2 because they are unnecessary.

may not discard any output with the security level different from "discard". If the security level is not "discard", the shredder 84 outputs an error message or the like indicating that the output 70 cannot be discarded and does not discard the output 70. The security level may be managed by the management server 40 only. That is, the bar code 81 on the output 70 may not include the security level. In this case, the management server 40 identifies the security level of each output 70 by the serial number and transmits the security level to the shredder 84.

S46: When the security level is "discard", the shredder 84 discards the output 70.

S47: The shredder 84 transmits an update request to the management server 40 designating the serial number and the security level "discard; completed".

S48: The reception unit 53b of the fifth communication unit 53 of the management server 40 receives the update request. The document management unit 59 identifies the output 70 by the serial number and updates the security level of the output 70 to, for example, the completed state.

Therefore, the management server 40 can manage the state of the output 70, when the process other than the security level set in the output 70 is not performed and the process according to the security level is performed. Further, the management server 40 can identify a user holding an output since the management server 40 stores the user ID of the user holding each output.

<Verification Based on Time>

By registering the time of printing in the output source table 302, the time from printing to verification can be used for verification. That is, when the time from when the output 70 is printed to when the output 70 reaches the receiver is longer than a predetermined value, the management server 40 can estimate that the output 70 is not genuine.

threshold 3 is determined in consideration of the physical distance between a shipper and the receiver or transportation time. When inferior goods are mixed or replaced, preparation of inferior goods takes time, and transportation takes longer than usual. The inferior goods may become easier to detect since the print date and time is printed on the output 70.

If the determination in step S33-23 is Yes, the verification unit 54 transmits the verification success to the verification result utilization system 60 (S33-24).

If the determination in step S33-23 is No, the verification unit 54 reports to the verification result utilization system 60 that the output 70 may not be genuine (S33-25).

Thus, possibility of the output 70 not being genuine can be detected based on the printing date and time of the output 70.

Effects of Embodiments

As described above, it is possible to estimate that the output 70 is genuine by printing the output source ID using the invisible material. Since the output source ID is invisible, copying of the output source ID becomes difficult, resulting in improved security, and further, the design of the output 70 is not interrupted. The output 70 may be printed on normal paper, the environment impact is small, and issuing and discarding of the output 70 is low in cost. A dedicated apparatus for issuing the output 70 is not neces-

TABLE 3

| Device ID | Cartridge ID | Output Source ID | Verification Count 1 | Serial Number | Verification Count 2 | User ID | Print Date and Time |
|---|---|---|---|---|---|---|---|
| A001 | B001 | C001 | 2 | 0001 | 1 | D001 | 10:15 May 31, 20xx |

Table 3 illustrates an example of the output source table 302 including the printing date and time. The output source table 302 of Table 3 includes printing date and time in addition to Table 1B. The date and time when the output 70 was printed is registered as the printing date and time. When the output 70 is attached to a product or the like, the printing date and time can be regarded as the shipping date and time of the product. The management server 40 also registers the date and time when registering the output source ID. The date and time may be transmitted from the image forming apparatus 30 or may be the time when the management server 40 registers the output source ID.

Figure 17:
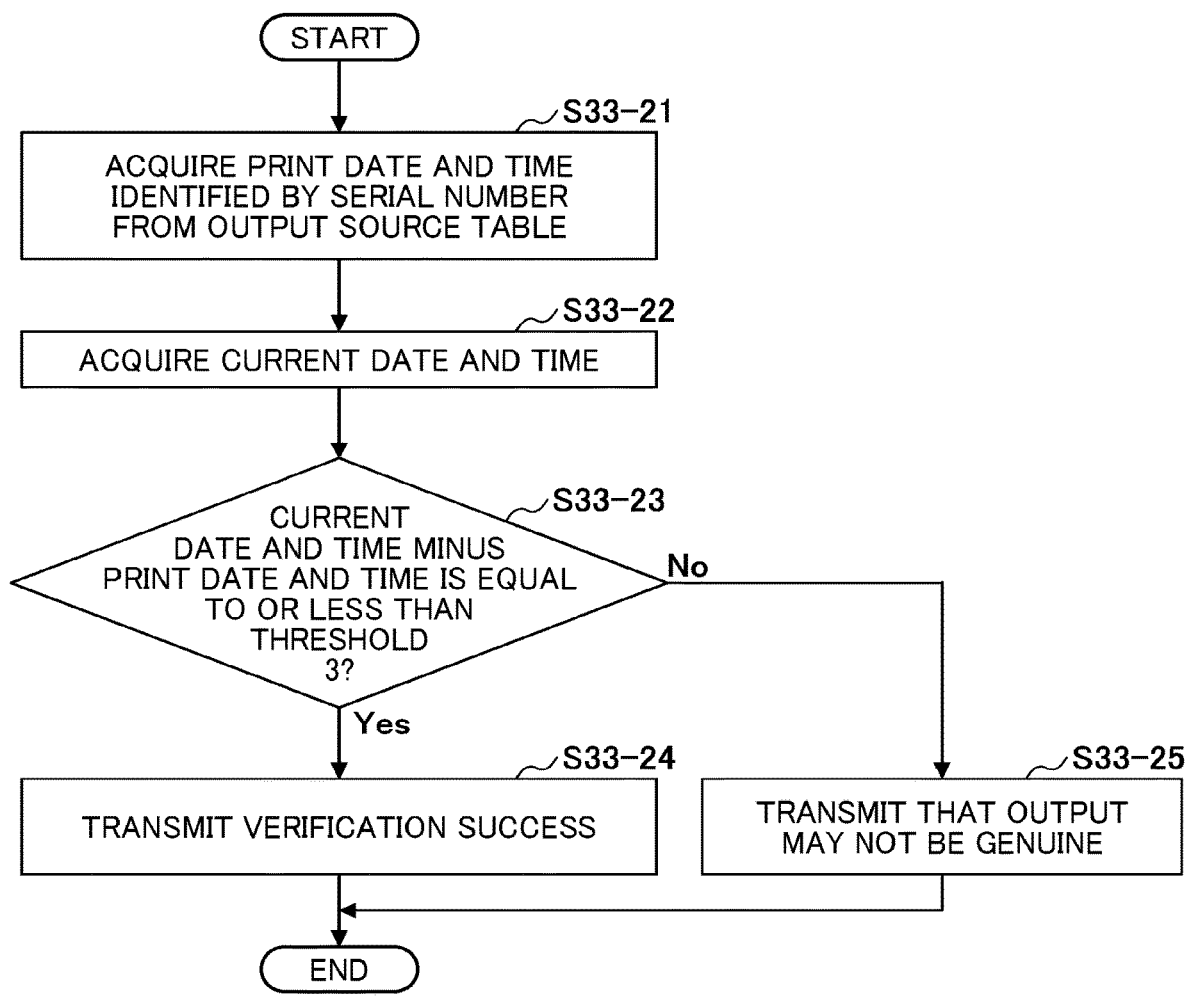
FIG. 17 is a flowchart illustrating details of the verification process.

FIG. 17 is a flowchart illustrating details of a verification process. In the flowchart illustrated in FIG. 17, verification based on the output source ID and the verification count is omitted.

The verification unit 54 acquires the print date and time identified by the serial number from the output source table 302 (S33-21).

Next, the verification unit 54 acquires the current date and time from a time server or the like (S33-22).

The verification unit 54 determines whether the difference between the current date and time and the print date and time is equal to or smaller than a threshold 3 (S33-23). That is, the verification unit 54 determines whether the time from when the output 70 was printed to the time when the output reached the receiver is less than expected or not. The threshold 3 is, for example, an estimated time from a shipment of goods to a receipt by a receiver, and thus the sary. The output 70 can be issued by the image forming apparatus 30 in a normal office.

Further, since the image forming apparatus 30 can print various information as an invisible image, traceability of the output 70 can be implemented by printing a serial number, a user ID, and the like. By combining the output 70, the management server 40, and the user authentication, it is possible to "store, discard, resend, and reissue" the output 70.

Other Examples of Application

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

For example, the bar code 81 in which the output source ID is coded by the invisible material may include information other than those described in the present embodiment. For example, location information (coordinates such as Global Positioning System (GPS)) at which the output 70 is printed may be included.

The example of functional configuration illustrated in FIG. 6 and the like are divided according to main functions in order to facilitate understanding of processing by the terminal 50, the image forming apparatus 30, the management server 40, and the verification result utilization system 60. The present disclosure is not limited by the method or name of division of processing units. The processes of the terminal 50, the image forming apparatus 30, the management server 40, and the verification result utilization system 60 can also be divided into more processing units according to the processing content. Also, one processing unit can be divided to include more processes.

Also, a plurality of management servers 40 may exist, or the functions of the management server 40 may be provided by a plurality of servers. The management server 40 for transmitting the output source ID to the image forming apparatus 30 and the management server 40 for verification may exist separately.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An authenticity determination system, comprising:
a server; and
an image forming apparatus connected to the server through a network, the image forming apparatus including first circuitry configured to:
acquire apparatus identification information, for identifying the image forming apparatus, from a memory of the image forming apparatus;
acquire consumables container identification information, for identifying a container of predetermined consumables, from the container which is mounted in the image forming apparatus;
receive a request to print using the predetermined consumables; and
in response to receiving the request to print using the predetermined consumables, transmit the apparatus identification information and the consumables container identification information to the server, wherein
the server includes second circuitry configured to:
receive, from the image forming apparatus in response to the image forming apparatus receiving the request to print, the apparatus identification information and the consumables container identification information transmitted;
determine whether the received apparatus identification information and the received consumables container identification information are already registered in a memory in association with each other; and
transmit information, indicating a determination result, to the image forming apparatus, and
the first circuitry is further configured to, in a case that the determination result is affirmative, execute printing based on output source identification information including the apparatus identification information and the consumables container identification information on an output using the predetermined consumables.

2. The authenticity determination system of claim 1, wherein
the consumables container identification information transmitted from the image forming apparatus to the server is identification information for identifying a container of consumables for security, and
the image forming apparatus prints the output source identification information on an output using the consumables for the security.

3. The authenticity determination system of claim 2, wherein the consumables for the security absorb less light in a visible light wavelength range than in an infrared wavelength range.

4. The authenticity determination system of claim 1, wherein in the case that the determination result is affirmative, the second circuitry is further configured to:
generate the output source identification information; and
transmit the output source identification information to the image forming apparatus.

5. The authenticity determination system of claim 1, wherein in the case that the determination result is affirmative, the first circuitry is further configured to:
generate the output source identification information; and
execute the printing based on the generated output source identification information using the predetermined consumables.

6. The authenticity determination system of claim 1, wherein in a case that the determination result is negative, the first circuitry is further configured to:
refrain from executing the printing based on the output source identification information using the predetermined consumables; and
execute another printing using consumables other than the predetermined consumables.

7. The authenticity determination system of claim 1, wherein in a case the determination result is negative, the first circuitry is further configured to:
refrain from executing the printing based on the output source identification information using the predetermined consumables; and
refrain from executing another printing using the consumables other than the predetermined consumables.

8. The authenticity determination system of claim 1, wherein in a case that the determination result is negative, the first circuitry is further configured to:
refrain from executing the printing based on the output source identification information using the predetermined consumables; and
execute another printing using the consumables other than the predetermined consumables with lower resolution compared to the printing in the case that the determination result is affirmative.

9. The authenticity determination system of claim 1, wherein in a case that the determination result is affirmative, the first circuitry is further configured to:
execute the printing based on the output source identification information using the predetermined consumables; and
execute another printing, of output identification information for identifying an output using the predetermined consumables, on the output with the output source identification information printed.

10. The authenticity determination system of claim 1, wherein the second circuitry is further configured to:
communicate with a verification result utilization system including third processing circuitry configured to read the output source identification information of an output and transmit a verification request of the output source identification information to the second circuitry;

register the output source identification information in a case that the printing based on the output source identification information on the output using the predetermined consumables is executed;

receive the verification request designating the output source identification information from the verification result utilization system;

verify the output source identification information based on whether the output source identification information is stored; and transmit a verification result to the verification result utilization system.

11. The authenticity determination system of claim 10, wherein the second circuitry is further configured to:

store a first number of verifications of the output source identification information in association with the output source identification information; and transmit information on a comparison result between the first number and a first threshold to the verification result utilization system.

12. The authenticity determination system of claim 10, wherein in a case that the printing based on the output source identification information using the predetermined consumables is executed on the output, the second circuitry is further configured to:

register output identification information for identifying an output in association with the output source identification information;

receive a verification request designating the output identification information from the verification result utilization system;

store a second number of verifications of the output identification information in association with the output source identification information; and transmit information on a comparison result between the second number and a second threshold to the verification result utilization system.

13. The authenticity determination system of claim 10, wherein in a case that the determination result is affirmative, the first circuitry is further configured to execute printing of product identification information and delivery destination information of a product to be delivered with an output printed with the output source identification information attached, using the predetermined consumables, and in a case that a verification request designating the product identification information and the delivery destination information is received from the verification result utilization system, the second circuitry is further configured to:

store the product identification information and the delivery destination information; and transmit, in a case that the same product identification information and the same delivery destination information are already stored, a verification result to the verification result utilization system indicating that the verification request of the same product identification information and the same delivery destination information has been received in the past.

14. The authenticity determination system of claim 10, wherein in a case that the printing based on the output source identification information including printing of output identification information for identifying an output on which the output source identification information is printed using the predetermined consumables is executed, the second circuitry is further configured to:

register a security level of the output in association with the output identification information;

receive a processing result of the output based on the output identification information and the security level from the verification result utilization system; and update the security level associated with the output identification information in accordance with the processing result.

15. The authenticity determination system of claim 14, wherein the first circuitry is further configured to print user identification information for identifying a user who printed the output, on the output using the predetermined consumables, and the second circuitry is further configured to register the user identification information in association with the output identification information.

16. The authenticity determination system of claim 10, wherein in a case that the printing based on the output source identification information on an output with the predetermined consumables is executed, the second circuitry is further configured to:

register a date and time when the output was printed in association with the output identification information for identifying the output on which the output source identification information is printed;

receive a verification request designating the output identification information from the verification result utilization system; and transmit a verification result according to a difference between the date and time associated with the output identification information and a current date and time to the verification result utilization system.

17. An image forming apparatus connected to a server through a network, the image forming apparatus comprising:

a memory; and circuitry configured to:

acquire apparatus identification information, for identifying the image forming apparatus from the memory;

acquire consumables container identification information, for identifying a container of predetermined consumables, from the container which is mounted in the image forming apparatus;

receive a request to print using the predetermined consumables;

in response to receiving the request to print using the predetermined consumables, transmit the apparatus identification information and the consumables container identification information to the server;

receive information from the server, the information indicating a determination result as to whether the apparatus identification information and the consumables container identification information are already registered in a memory in association with each other; and in a case that the determination result is affirmative, execute printing based on output source identification information including the apparatus identification information and the consumables container identification information on an output using the predetermined consumables.

18. A printing method performed by an image forming apparatus, the printing method comprising:

storing, in a memory, apparatus identification information for identifying the image forming apparatus;

acquiring the apparatus identification information from the memory;

acquiring consumables container identification information, for identifying a container of predetermined consumables, from the container which is mounted in the image forming apparatus;

receiving a request to print using the predetermined consumables; and in response to receiving the request to print using the predetermined consumables, transmitting the apparatus identification information and the consumables container identification information to a server;

receiving, from the server, information indicating a determination result as to whether the apparatus identification information and the consumables container identification information are already registered in a memory in association with each other; and in a case that the determination result is affirmative, executing printing based on output source identification information including the apparatus identification information and the consumables container identification information on an output using the predetermined consumables.

* * * * *